(12) United States Patent
Xi et al.

(10) Patent No.: US 10,654,557 B2
(45) Date of Patent: May 19, 2020

(54) MORPHING SKIN FOR AN AIRCRAFT

(71) Applicant: BOMBARDIER INC., Dorval (CA)

(72) Inventors: Fengfeng Xi, Toronto (CA); Amin Moosavian, Mississauga (CA); Allan Daniel Finistauri, Brampton (CA)

(73) Assignee: BOMBARDIER INC., Dorval (CA)

( * ) Notice: Subject to any disclaimer, the term of this patent is extended or adjusted under 35 U.S.C. 154(b) by 362 days.

(21) Appl. No.: 15/513,439

(22) PCT Filed: Sep. 24, 2015

(86) PCT No.: PCT/IB2015/057361
§ 371 (c)(1),
(2) Date: Mar. 22, 2017

(87) PCT Pub. No.: WO2016/046787
PCT Pub. Date: Mar. 31, 2016

(65) Prior Publication Data
US 2017/0305525 A1 Oct. 26, 2017

Related U.S. Application Data

(60) Provisional application No. 62/055,174, filed on Sep. 25, 2014.

(51) Int. Cl.
*B64C 3/38* (2006.01)
*B64C 3/40* (2006.01)
(Continued)

(52) U.S. Cl.
CPC .................. *B64C 3/38* (2013.01); *B64C 3/26* (2013.01); *B64C 3/385* (2013.01); *B64C 3/40* (2013.01);
(Continued)

(58) Field of Classification Search
CPC ....... B64C 3/48; B64C 3/54; B64C 2003/445; B64C 3/38; B64C 3/385; B64C 3/40;
(Continued)

(56) References Cited

U.S. PATENT DOCUMENTS 1,653,903 A * 12/1927 Hall .......................... B64C 3/54
244/218
1,710,672 A * 4/1929 MacDonald Bonney ...................
B64C 3/52
244/215
(Continued)

FOREIGN PATENT DOCUMENTS

CN 102507128 A 6/2012
CN 102582822 A 7/2012
(Continued)

OTHER PUBLICATIONS

Barbarino, S., Bilgen, O., Ajaj, R. M., Friswell, M. I., & Inman, D. J. (2011). A review of morphing aircraft. Journal of intelligent material systems and structures, 22(9), 823-877. (Year: 2011).*
(Continued)

*Primary Examiner* — Assres H Woldemaryam
(74) *Attorney, Agent, or Firm* — Norton Rose Fulbright Canada LLP

(57) ABSTRACT

A skin for an aircraft is configured to be disposed on a first rigid member and on a second rigid member. The second rigid member is movable with respect to the first rigid member and a distance is defined between the first rigid member and the second rigid member. A morphing member of the skin extends between the first rigid member and the second rigid member. The morphing member comprises first segments forming a first portion attached to the first rigid member and second segments forming a second portion attached to the second rigid member. The first and second portions are separated along a substantially linear seam in
(Continued)

the absence of change in the distance and an orientation between the first rigid member and the second rigid member.

3 Claims, 21 Drawing Sheets

(51) Int. Cl.
| | |
|---|---|
| *B64C 3/42* | (2006.01) |
| *B64C 3/52* | (2006.01) |
| *B64C 5/10* | (2006.01) |
| *B64C 5/14* | (2006.01) |
| *B64C 3/26* | (2006.01) |
| *B64C 3/44* | (2006.01) |
| *B64C 3/54* | (2006.01) |

(52) U.S. Cl.
CPC .................. *B64C 3/42* (2013.01); *B64C 3/52* (2013.01); *B64C 5/10* (2013.01); *B64C 5/14* (2013.01); *B64C 3/54* (2013.01); *B64C 2003/445* (2013.01); *B64C 2003/543* (2013.01); *Y02T 50/14* (2013.01)

(58) Field of Classification Search
CPC .... B64C 3/44; B64C 3/26; B64C 3/52; B64C 2003/543; B54C 3/52; B54C 2003/543
See application file for complete search history.

(56) References Cited

U.S. PATENT DOCUMENTS

| | | | |
|---|---|---|---|
| 3,172,621 A | 5/1965 | Erwin | |
| 4,200,253 A | 4/1980 | Rowarth | |
| 4,582,278 A | 4/1986 | Ferguson | |
| 4,824,053 A * | 4/1989 | Sarh | B23Q 1/601 244/218 |
| 5,222,699 A | 6/1993 | Albach et al. | |
| 6,070,834 A | 6/2000 | Janker et al. | |
| 7,422,051 B2 | 9/2008 | Sinha | |
| 7,789,343 B2 | 9/2010 | Sarh et al. | |
| 7,802,759 B2 | 9/2010 | Ishikawa et al. | |
| 8,164,232 B2 | 4/2012 | Kombluh et al. | |
| 8,235,329 B1 | 8/2012 | Darling | |
| 8,276,851 B2 | 10/2012 | McKeon | |
| 8,342,447 B2 | 1/2013 | Etling | |
| 8,366,057 B2 | 2/2013 | Vos et al. | |
| 8,439,314 B1 | 5/2013 | Dhall | |
| 8,534,611 B1 * | 9/2013 | Pitt | B64C 3/50 244/214 |
| 8,703,268 B2 | 4/2014 | Henry et al. | |
| 8,746,626 B1 | 6/2014 | Henry et al. | |
| 8,770,523 B2 | 7/2014 | Pfaller | |
| 8,783,604 B2 | 7/2014 | Sanderson et al. | |
| 9,010,693 B1 * | 4/2015 | Barbieri | B64C 39/024 244/218 |
| 2005/0045765 A1 | 3/2005 | Pitt | |
| 2005/0077435 A1 | 4/2005 | Burchard | |
| 2006/0118675 A1 * | 6/2006 | Tidwell | B64C 3/40 244/123.1 |
| 2006/0145029 A1 | 7/2006 | Lonsinger | |
| 2006/0145031 A1 | 7/2006 | Ishikawa et al. | |
| 2007/0138341 A1 | 6/2007 | Joshi et al. | |
| 2008/0035798 A1 * | 2/2008 | Kothera | B63B 1/248 244/212 |
| 2008/0121338 A1 | 5/2008 | Wei | |
| 2009/0008507 A1 | 1/2009 | Pearson | |
| 2011/0038727 A1 | 1/2011 | Vos et al. | |
| 2011/0084174 A1 | 4/2011 | Hemmelgarn et al. | |
| 2011/0101172 A1 * | 5/2011 | Dyckrup | B64C 7/00 244/201 |
| 2011/0114791 A1 * | 5/2011 | Henry | B29C 70/088 244/123.6 |
| 2012/0061523 A1 | 3/2012 | Havar et al. | |
| 2014/0037873 A1 * | 2/2014 | Cheung | B32B 3/06 428/34.1 |

FOREIGN PATENT DOCUMENTS

| | | |
|---|---|---|
| CN | 102673774 A | 9/2012 |
| CN | 103192982 A | 7/2013 |
| DE | 102008022422 A1 | 11/2009 |
| EP | 2644361 A1 | 2/2013 |
| GB | 797376 | 7/1958 |
| GB | 1296994 | 11/1972 |
| JP | 201157195 A | 3/2011 |
| KR | 101271485 | 6/2013 |
| RU | 2011152641 A | 6/2013 |
| RU | 2493050 C2 | 9/2013 |
| WO | 2011017071 A2 | 2/2011 |
| WO | 2013192483 A1 | 12/2013 |
| WO | 2014041221 A1 | 3/2014 |

OTHER PUBLICATIONS

Bubert, E. A., Woods, B. K., Lee, K., Kothera, C. S., & Wereley, N. M. (2010). Design and fabrication of a passive 1D morphing aircraft skin. Journal of Intelligent Material Systems and Structures, 21(17), 1699-1717. (Year: 2010).*

Amin Moosavian, Fengfeng Xi, Seyed M. Hashemi, "Design and Motion Control of Fully Variable Morphing Wings", Journal of Aircraft, vol. 50, No. 4, Jul.-Aug. 2013; published online Jul. 30, 2013; https://doi.org/10.2514/1.C032127 (Year: 2013).*

Ramrakhyani, Deepak S., et al. "Aircraft structural morphing using tendon-actuated compliant cellular trusses." Journal of aircraft 42.6 (2005): 1614-1620. (Year: 2005).*

The State Intellectual Property Office of the People's Republic of China, Notification of First Office Action dated Jul. 16, 2018 re: Chinese Patent Application No. 201580051804.7.

English translation of CN102582822A, Jul. 18, 2012, obtained from https://patents.google.com/patent/CN102582822A/en?oq= CN102582822A acessed on Sep. 27, 2018.

English translation of CN102673774, Sep. 19, 2012, obtained from https://patents.google.com/patent/CN102673774A/en?oq= CN102673774 accessed on Sep. 27, 2018.

PCT international Search Report and Written Opinion dated Feb. 22, 2016 re: International Application No. PCT/IB2015/057361.

Christopher Griffin, Pressure Deflection Behavior of Candidate Materials for a Morphing Wing, Thesis submitted to the College of Engineering and Mineral Resources at West Virginia University, 2007, ProQuest Information and Learning Company, United States of America.

Pennstate University, Airplane Wings That Change Shape Like a Bird's Have Scales Like a Fish, Apr. 20, 2004, United States of America, http://news.psu.edu/story/ . . .

C. Thill et al., Morphing Skins, The Aeronautical Journal, Paper No. 3216, Mar. 2008, United Kingdom.

English translation of Chinese patent document No. CN 102507128 dated Jun. 20, 2012, https://www62.orbit.com . . .

English translation of Chinese patent document No. CN 103192982 dated Jul. 10, 2013, https://www62.orbit.com . . .

English translation of German patent document No. DE 102008022422 dated Nov. 19, 2009, https://www62.orbit.com . . .

English translation of Japanese patent document No. JP 201157195 dated Mar. 24, 2011, https://www62.orbit.com . . .

English translation of Korean patent document No. KR 101271485 dated Jun. 5, 2013, https://www62.orbit.com . . .

English translation of Russian patent document No. RU 2493050 dated Sep. 20, 2013, https://www62.orbit.com . . .

English translation of patent document No. WO 2014/041221 dated Mar. 20, 2014, https://www.google.ca/patents/ . . .

* cited by examiner

MORPHING SKIN FOR AN AIRCRAFT

CROSS-REFERENCE TO RELATED APPLICATION(S)

This application is a national phase application under 35 U.S.C. 371 of International Patent Application No. PCT/IB2015/057361 filed on Sep. 24, 2015 which claims priority to U.S. provisional patent application No. 62/055,174 filed on Sep. 25, 2014, the entire contents of which are hereby incorporated by reference.

FIELD OF THE INVENTION

The present invention concerns the construction and operation of a morphing skin for an aircraft. More specifically, the present invention concerns a morphing skin for an aircraft wing where the shape of the wing may be altered during flight to alter the flight characteristics of the aircraft. The morphing skin adjusts its configuration to adapt to the changing shape of the wing.

DESCRIPTION OF THE RELATED ART

The prior art include several examples of aircraft wings that address a number of different concerns with respect thereto.

It is noted that the prior art includes a number of examples where the wings of an aircraft may be modified along the longitudinal axis of the aircraft to alter the lift properties associated therewith.

For example, U.S. Patent Application Publication No. 2011/0001018 (hereinafter "the '018 Application") describes a composite material for a geometric morphing wing. FIGS. 4 and 5A-5D illustrate various wing morphologies that are contemplated by the apparatus described in the '018 Application.

U.S. Pat. No. 7,909,292 (hereinafter "the '292 Patent") describes a wing unit, specifically a spar box, that forms aerodynamically active surfaces. The shape of the wing surface is alterable, according to one aspect of the '292 Patent. The '292 Patent at col. 3, lines 7-16.)

U.S. Pat. No. 7,108,231 (hereinafter "the '231 Patent") describes an adjustment mechanism, for a variable wing shape. Multiple whirl chambers WK are provided to alter the shape of a portion of the wing. (See, e.g., the '231 Patent at col. 8, lines 32-46.)

In another example, U.S. Patent Application Publication No. 2011/0038727 (hereinafter "the '727 Application") describes a method and apparatus that provides a wing for an aircraft that morphs in a longitudinal direction. The '727 Application describes adaptive technology that may be relied upon to alter the shape of the wing. Specifically, the '727 Application describes a honeycomb material where the stiffness of the material may be changed based on cell differential pressure. (The '727 Application at paragraph [0086].) In one embodiment, ambient pressure alters the stiffness of the honeycomb material. (The '727 Application at paragraph [0087].) In another embodiment, the aircraft's bleed air may be used to control the cell differential pressure and, therefore, the stiffness of the honeycomb material. (The '727 Application at paragraph [0088].)

U.S. Patent Application Publication No. 2011/0017876 (hereinafter "the '876 Application") describes a method and apparatus for controlling the longitudinal shape of an aircraft's control surface, such as an aileron, elevator, rotor, trim, rudder, spoiler, and the like. (The '876 Application at paragraph [0006].) The control surface is made from a flexible skin 428 that is supported on ribs 410, 412. (The '876 Application at paragraph [0073].) An assembly, made from many linkages 438-452, connects to the flexible skin 428. (The '876 Application at paragraph [0075].) Actuators 478, 479 cooperate with connecting members 453, 457 to alter the shape of the flexible skin 428. (The '876 Application at paragraphs [0081].)

U.S. Patent Application Publication No. 2009/0302168 (hereinafter "the '168 Application") describes a compliant structure that permits morphing of the leading edge of an airfoil, such as a rotor blade. (The '168 Application at paragraph [0079].)

U.S. Patent Application Publication No. 2007/0120011 (hereinafter "the '011 Application") describes airfoils made from metastable materials for whose shapes may be changed when subjected to certain conditions. (The '011 Application at paragraph [0006].) Piezoelectric materials, shape memory alloys, magnetorestrictive materials, ferroelectric materials, shape memory polymers, or electroactive polymers are some of the possible materials that may be employed. (The '011 Application at paragraph [0018].)

U.S. Patent Application Publication No. 2006/0157623 (hereinafter "the '623 Application") also describes an airfoil with a shape that is deformable in the longitudinal direction.

U.S. Patent Application Publication No. 2006/0145029 (hereinafter "the '029 Application") describes a wing with an adaptable profile. Specifically, the '029 Application describes a wing with a flexible region 15 having a profile changeable in both a wing chord direction 5 (i.e., the air flow direction) and the wingspan direction 10 (i.e., the cross flow direction, perpendicular to the wing chord direction). (The '029 Application at paragraph [0017]-[0018].) The flexible region 15 includes a number of actuators 60 that act on torsion boxes 53 to change the shape of the wing. (The '029 Application at paragraphs [0021]-[0022].)

U.S. Patent Application Publication No. 2002/0100842 (hereinafter "the '842 Application") describes a mechanism for regionally adjusting the curvature of an airfoil. The mechanism permits adjustment of a leading edge region 11 and a trailing edge region 12. (The '842 Application at paragraph [0025].) The mechanism also permits the curvature of the entire wing 1 to be changed, (The '842 Application at paragraph [0025].)

U.S. Pat. No. 7,883,060 (hereinafter "the '060 Patent") describes an apparatus and method for twisting a wing to increase lift on an aircraft. Specifically, the '060 Patent discusses the twisting of a wing as shown, for example, in FIGS. 17 and 18. (The '060 Patent at col, 21, lines 33-36.)

U.S. Pat. No. 7,607,617 (hereinafter "the '617 Patent") describes a spar box for an aerodynamically active surface, such as an airfoil, horizontal tail unit, or rudder of an airplane. The spar box permits alteration of the surface shape between upper and lower surfaces of the aerodynamically active surface.

As should be apparent from the foregoing discussion, a good bit of attention has been focused on changing the longitudinal shape of an aircraft's wings to take advantage of different shapes under different flight conditions.

Few inventions, however, appear to focus on wing morphology in the lateral direction (e.g., along the span of the wing).

Moreover, fewer inventions appear to focus on the skin applied to a wing with an adjustable morphology.

SUMMARY OF THE INVENTION

The present invention addresses one or more deficiencies associated with the skins applied to wings known in the prior art.

The present invention provides for a skin for an aircraft. The skin includes a first rigid member, which has at least a portion of a structural frame for the aircraft. The skin also includes a second rigid member, which has at least a portion of the structural frame for the aircraft. The second rigid member is movable with respect to the first rigid member and a distance is defined between the first rigid member and the second rigid member. A morphing member extends between the first rigid member and the second rigid member. The morphing member compensates for at least one of a change in the distance and a change in an orientation between the first rigid member and the second rigid member.

In one contemplated embodiment, the morphing member includes a flexible membrane defining a top surface, a bottom surface, a first lateral edge, and a second lateral edge. The first lateral edge connects to the first rigid member, and the second lateral edge connects to the second rigid member.

It is contemplated that the flexible membrane may include an elastane fabric and latex applied to the elastane fabric.

In another contemplated embodiment, the flexible membrane may be made of an elastane fabric and latex impregnated into the elastane fabric.

It is contemplated that the morphing member may have a first plurality of segments attached to the first rigid member and a second plurality of segments attached to the second rigid member. If so, the first plurality of segments are contemplated to be movable with respect to one another. The second plurality of segments also are contemplated to be movable with respect to one another.

In a further contemplated embodiment, adjacent ones of the first plurality of segments are in register with corresponding ones of the second plurality of segments, adjacent ones of the first plurality of segments are slidingly disposed adjacent to corresponding ones of the second plurality of segments, and adjacent ones of the first plurality of segments overlap corresponding ones of the second plurality of segments.

For still another contemplated embodiment, each of the ones of the first plurality of segments may comprise a central channel and each of the corresponding ones of the second plurality of segments may be slidingly disposed in the central channels of the ones of the first plurality of segments.

With respect to one embodiment of the present invention, the first plurality of segments and the second plurality of segments comprise at least one of aluminum, an alloy of aluminum, beryllium, an alloy of beryllium, magnesium, an alloy of magnesium, iron, an alloy of iron, polymers such as plastics or rubbers, ceramics, and composite materials.

It is one aspect of the present invention to provide a morphing member that has a plurality of segments arranged in rows, each plurality of segments being connected at a first end to the first rigid member and at a second end to the second rigid member. An elastic material connects the plurality of segments to one another.

The plurality of segments may overlap one another.

The plurality of segments may be made from aluminum, an alloy of aluminum, beryllium, an alloy of beryllium, magnesium, an alloy of magnesium, iron, an alloy of iron, polymers such as plastics or rubbers, ceramics, and/or composite materials.

Where the skin includes an elastic material, the elastic material may be presented as an elastic strip.

If an elastic strip is employed, the elastic strip may include an elastane fabric and latex applied to the elastane fabric.

Alternatively, the elastic strip may be made from an elastane fabric with latex impregnated into the elastane fabric.

The skin may be made from several rows of segments disposed adjacent to one another.

The morphing member may be made from a first skin element connected to the first rigid, member, a second skin element movably connected to the first skin element, at least one connector connecting the first skin element to the second skin element, and a third skin element disposed between the first skin element and the second skin element.

The first skin element and the second skin element may be made from rigid materials.

It is contemplated that the first skin element and the second skin element may be made from one or more of aluminum, an alloy of aluminum, beryllium, an alloy of beryllium, magnesium, an alloy of magnesium, iron, an alloy of iron, polymers such as plastics or rubbers, ceramics, and composite materials.

The third skin element may be a flexible material.

The third skin element may be made from an elastane fabric with latex applied to the elastane fabric. Alternatively, the third skin element may be an elastane fabric where latex is impregnated into the elastane fabric.

In one further contemplated embodiment, the connector may have a scissor-jack construction.

Still further features of the present invention should be appreciated from the drawings appended hereto and from the discussion herein.

BRIEF DESCRIPTION OF THE DRAWINGS

The present invention will now be described in connection with the drawings appended hereto, in which.

DETAILED DESCRIPTION OF EMBODIMENT(S) OF THE INVENTION

Figure 1:
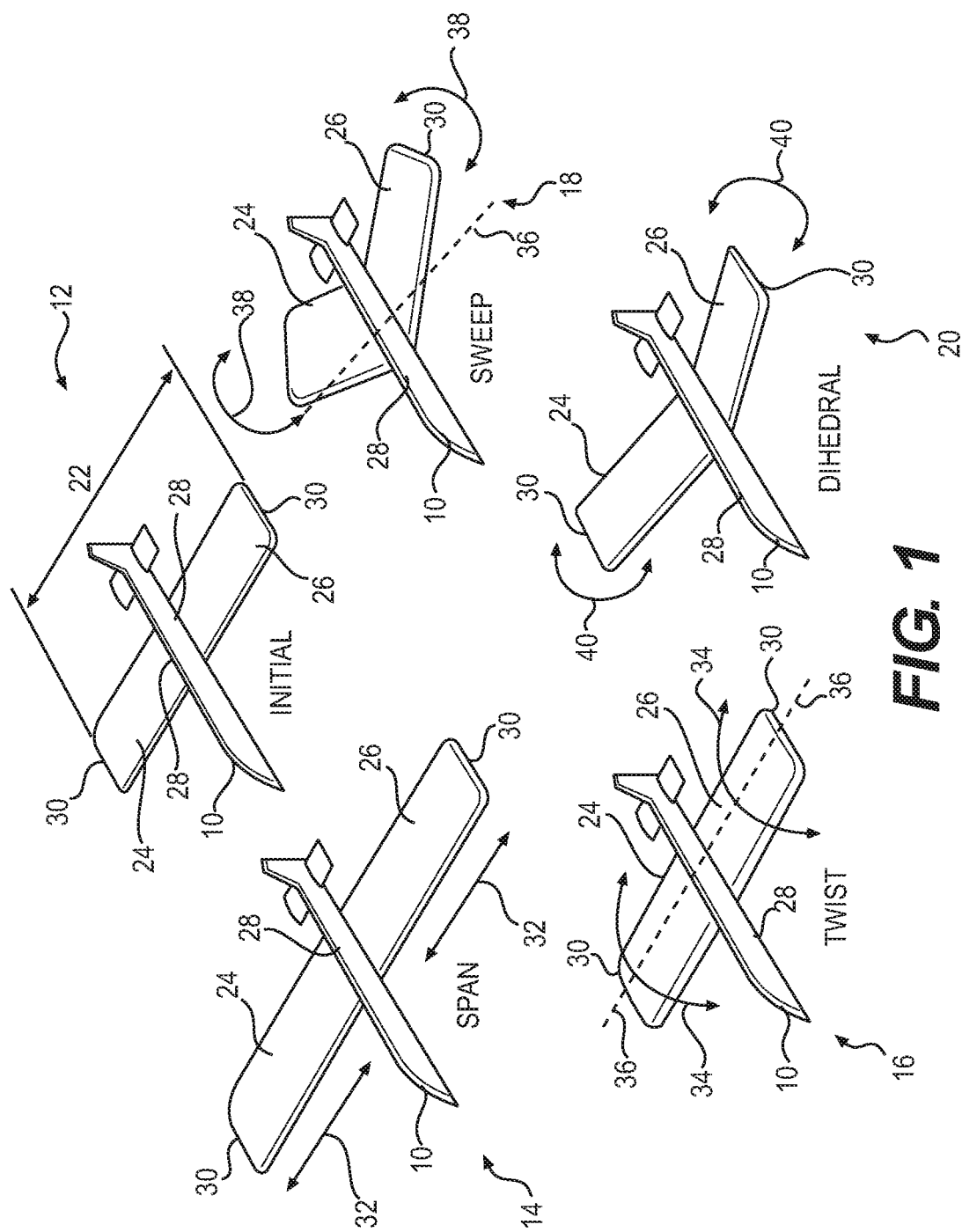
FIG. 1 is a graphical illustration of four types of wing motion that are addressed by the morphing skin of the present invention.

The present invention will now be described in connection with one or more embodiments. Discussion of any one particular embodiment is intended to be illustrative of the breadth and scope of the invention. In other words, while attention is focused on specific embodiments, those embodiments are not intended to be limiting of the scope of the present invention. To the contrary, after appreciating the discussion and drawings presented herein, those skilled in the art will readily appreciate one or more variations and equivalents of the embodiments described and illustrated. Those variations and equivalents are intended to be encompassed by the present invention as though they were described herein.

As a point of convention, as should be understood by those skilled in the art, an aircraft includes a front end and a rear end that define a longitudinal axis. The wings, which extend outwardly from the fuselage of the aircraft, define a lateral axis. In the discussion that follows, therefore, reference to a longitudinal axis is intended to refer to an axis parallel to the longitudinal axis of the aircraft. Similarly, reference to a lateral axis is intended to refer to an axis that is parallel to the lateral axis of the aircraft.

As another point of convention, the s "front," "rear," "up," "down," "right," "left," "starboard," and "port" are intended to refer to directions that are consistent with the direction of travel of a conventional aircraft. The use of these conventions, however, is not intended to be limiting of the present invention. To the contrary, these terms are used merely to facilitate discussion of the considerable breadth and scope of the present invention.

Throughout the discussion that follows, the present invention will be discussed in connection with the wings of an aircraft. While the discussion of the present invention focuses on the wings of an aircraft, the present invention should not be considered as being limited to a "wing." To the contrary, the present invention may be applied to any aircraft surface, including but not limited to those that provides control over the aerodynamic properties of an aircraft, such as the horizontal stabilizer, the vertical stabilizer, the rudder, the engine pylon, or the winglet. Similarly, while the present invention is described in connection with aircraft, the present invention may be applied to other vehicle types including, but not limited to, submersible vehicles, such as submarines.

Additionally, the present invention is described in connection with its application to commercial aircraft, which includes passenger aircraft and private or business jets. While the present invention is described in this context, it should be noted that the present invention should not be understood to be limited to just commercial embodiments. To the contrary, the present invention is anticipated to be applicable to any type of aircraft.

Among other variables considered when designing an aircraft, aerospace engineers are challenged to create aircraft that have better fuel efficiency than their predecessors in the prior art. There are a few reasons for this. First, if an aircraft uses less fuel, its operational costs may be reduced. Second, greater fuel efficiency may permit the aircraft to fly longer distances, because it uses less fuel per nautical mile traveled. Third, greater fuel efficiency generates lower pollution.

To achieve greater fuel efficiency, aerospace engineers focus on variables including the efficiency of the aircraft's engines, the weight of the aircraft, and the aerodynamic properties of the airframe. As should be apparent, if the engines themselves are more fuel efficient, the aircraft will be more efficient. If the aircraft is lighter in weight, then the aircraft should be able to achieve greater fuel efficiency simply because there is less weight for the engines to push. Finally, the aerodynamic properties of the airframe, such as the aerodynamic drag, may be altered to increase fuel efficiency.

The present invention focuses on the third of the three parameters identified above. Specifically, the present invention provides for an aircraft with an improved aerodynamic profile that results in a more efficient aircraft, among other benefits. More specifically, the present invention provides for a morphing skin for a morphing wing that adjusts to in-flight changes in the shape of the wing. The skin, therefore, helps to optimize performance of the aircraft under variable conditions.

Typically, aircraft experience three different modes of operation when in flight, among other modes of operation. The first triode of operation concerns flight characteristics associated with the aircraft during take-off and ascent. The second mode of operation concerns flight characteristics associated with the aircraft when flying at a cruising altitude. The third mode of operation concerns flight characteristics when the aircraft is in a descent, approaching an airport for landing. While these three modes of operation are discussed herein, the present invention is not intended to be limited solely to these three modes of operation. There are numerous other modes of operation that are intended to be encompassed by the present invention.

Each of these three modes of operation subjects the aircraft to different dynamic, flight conditions. For an aircraft to perform optimally in each of these three modes, the aircraft must alter its flight characteristics. In most modern aircraft, this includes altering the displacement and/or angle of one or more of the aerodynamic surfaces on the wing, such as the flaps. Flaps also are referred to as "high-lift" surfaces or "control" surfaces, depending upon the specific operation of the aerodynamic surface. As should be apparent to those skilled in the art, high-lift surfaces enhance lift generated by the wing. As also should be apparent to those skilled in the art, control surfaces typically refer to those surfaces that steer the aircraft. It is noted that these terms may be used interchangeably. Depending upon the design and orientation of the aircraft, it is possible that a high-lift surface may provide control or that a control surface may provide lift.

While changing the configuration of the high-lift surfaces (e.g., flaps and slats) on an aircraft's wing is a suitable solution to altering the aerodynamic properties of the aircraft during flight, these types of alterations do not take full advantage of the aerodynamic principles that are associated with aircraft wings. More specifically, these types of adjustment do not take advantage of the ways in which the wings of an aircraft may be changed during flight to alter the flight characteristics of the aircraft (e.g., combination of longitudinal and lateral shape changes).

Naturally, when wings are designed to change shape, it follows that the skins on those wings also need to change shape. With respect to the present invention, a discussion of one or more embodiments of a morphing skin is first presented. It is noted that the morphing skin of the present invention is contemplated to be applicable to any morphing wing and, therefore, is not limited to the specific constructions) presented below.

As a point of reference, with reference to FIG. 1, there are four primary ways in which the wing of an aircraft may be altered. The four ways are referred to herein as wing morphologies. The four wing morphologies for an aircraft 10, which indicate a wing shape change from an initial state 12, are: (1) a span morphology 14, (2) a twist morphology 16, (3) a sweep morphology 18, and (4) a dihedral morphology 20.

A span morphology 14 refers to a change in the overall wing span 22 of the aircraft 10. As should be apparent to those skilled in the art, the wing span 22 typically refers to the dimension that is measured from the tip of one wing 24 to the tip of the opposing wing 26. In multi-wing aircraft, the wing span 22 is the largest span dimension of the aircraft 10. For purposes of the present discussion, the term wing span (or span) also is used to describe the length of an individual wing 24, 26 from its root 28 to its tip 30.

With reference to the span morphology 14, a wing 24, 26 that is able to alter its span 22 has the capability of enlarging or shrinking along the span 22 of the wing 24, 26. The arrows 32 indicate this motion.

With reference to the twist morphology 16, a wing 24, 26 that is able to alter its shape along the length of the span 22 will move in accordance with the arrows 34. As should be apparent, a twisting motion is a rotational motion around an axis 36 that extends along the span 22 of the wing 24, 26.

With reference to the sweep morphology 18, a wing 24, 26 that is able to alter its shape along the span 22 will move in accordance with the arrows 38. In other words, the wings 24, 26 are able to move forwardly or rearwardly in relation to the axis 36.

With reference to the dihedral morphology 20, a wing 24, 26 that is able to alter its shape along the span 22 will move in accordance with the arrow 40. In other words the wings move upwardly or downwardly with reference to a starting position. This is akin to a flapping motion for the wings 24, 26.

Figure 2:
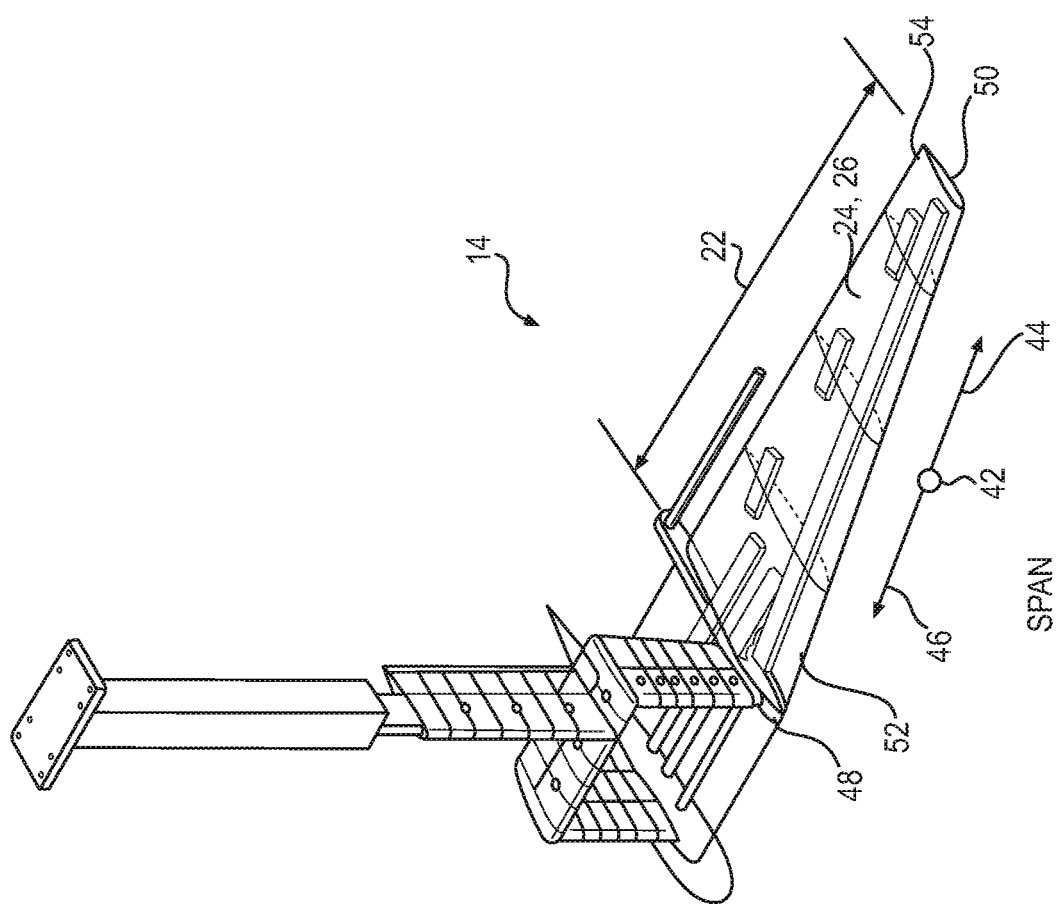
FIG. 2 is a perspective, graphical illustration of an engineering mock-up of a wing for an aircraft, illustrating span motion of the wing.

FIG. 2 is a graphical depiction of an engineering mock-up of a wing 26 with a span 22, as defined above. In this illustration, a point 42 is defined in relation to the wing 26. If the span 22 is changed according to the span morphology 14, the point 42 will move outwardly from the body of the aircraft 10 as shown by arrow 44 or inwardly toward the body of the aircraft 10 as shown by arrow 46.

For reference, the wing 26 has a root 48, a tip 50, a leading edge 52, and a trailing edge 54. The wing 26 also includes an upper surface and a lower surface that provide lift (among other properties) for the aircraft 10.

Figure 3:
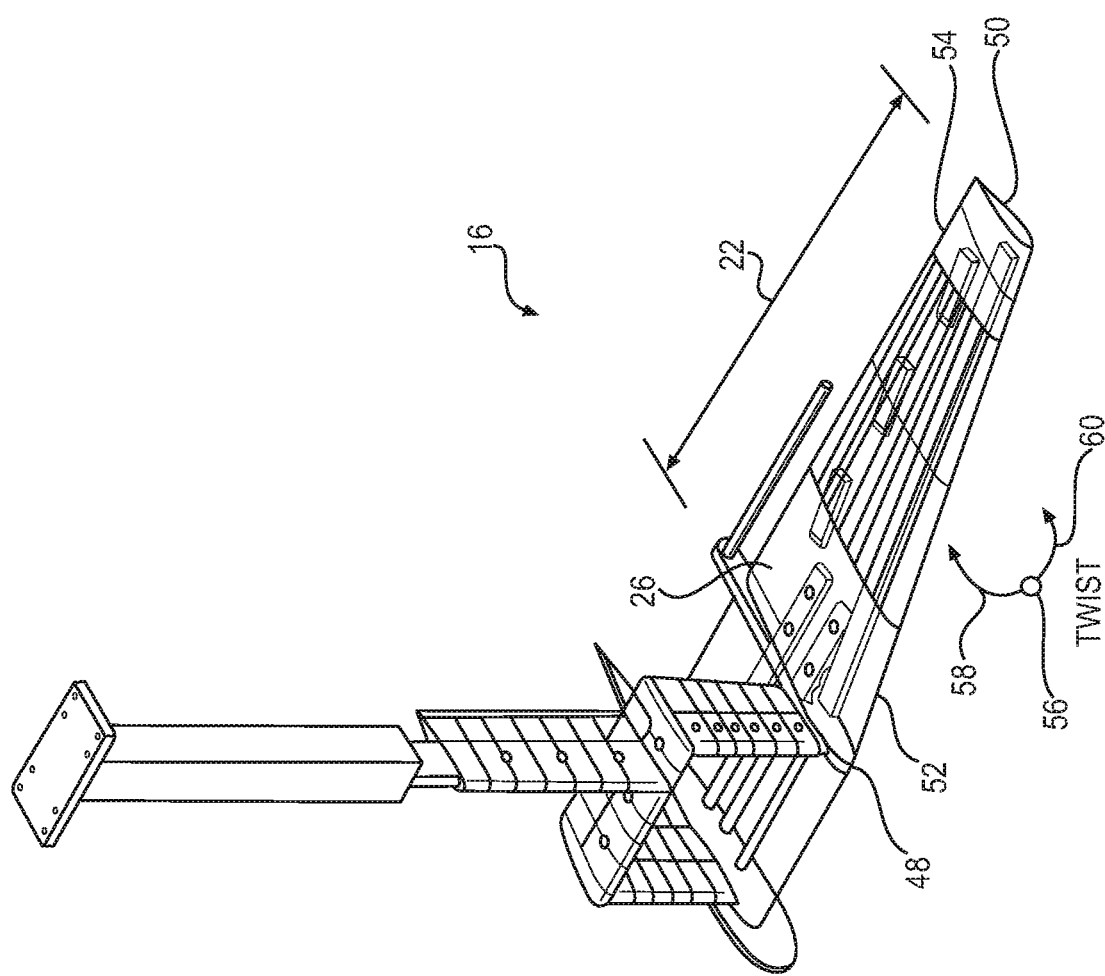
FIG. 3 is a perspective, graphical illustration of an engineering mock-up of a wing for an aircraft, illustrating twist motion of the wing.

FIG. 3 is a graphical depiction of an engineering mockup of a wing 26 with a span 22. In this illustration, a point 56 is defined in relation to the wing 26. If the wing 26 is changed in its shape according to the twist morphology 16, the point 56 will move upwardly along the upper arrow 58 or downwardly along the lower arrow 60 depending upon the direction of the twisting motion.

Figure 4:
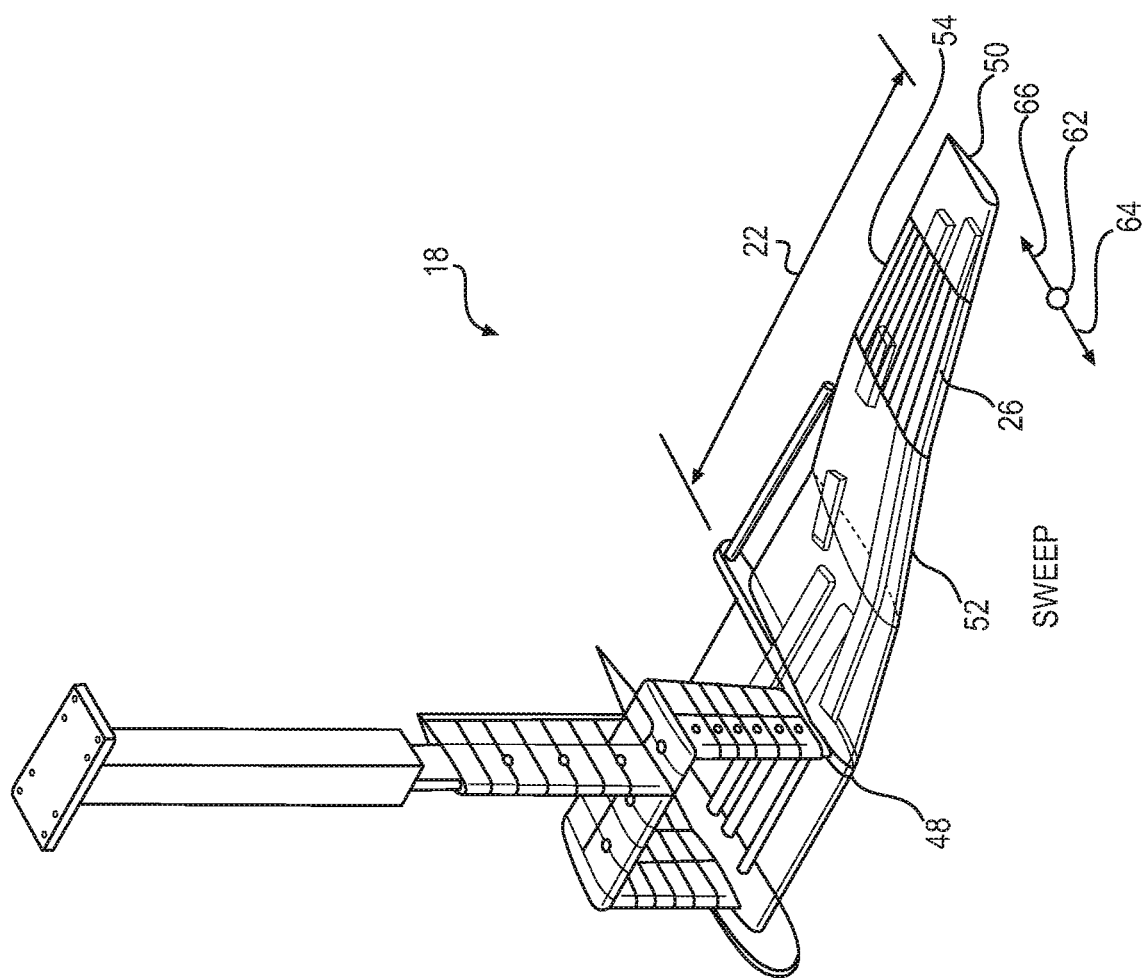
FIG. 4 is a perspective, graphical illustration of an engineering mock-up of a wing for an aircraft, illustrating sweep motion of the wing.

FIG. 4 is a graphical depiction of an engineering mockup of a wing 26 with a span 22. In this illustration, a point 62 is defined in relation to the wing 26, if the wing 26 is changed in its shape according to a sweep morphology 18, the point 62 will move forwardly along arrow 64 or rearwardly along arrow 66.

Figure 5:
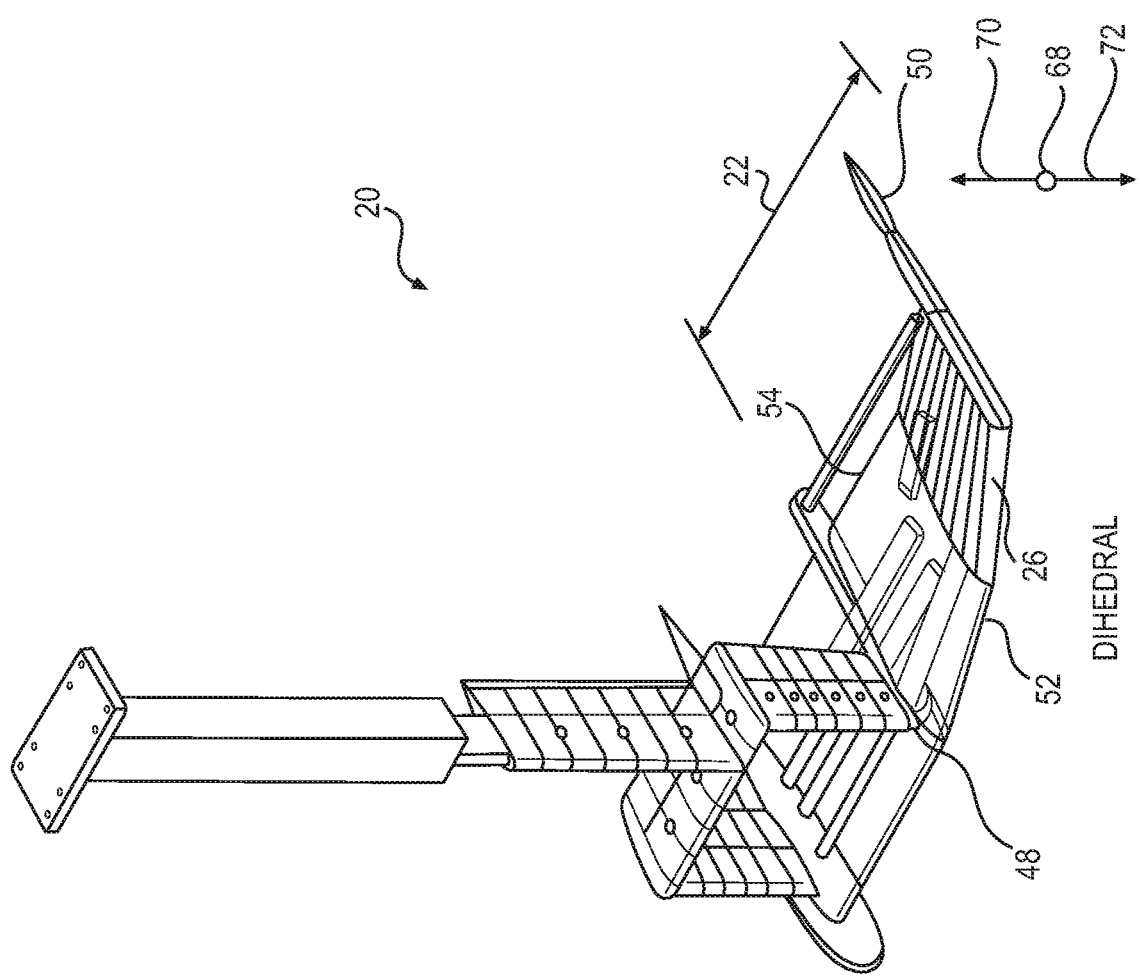
FIG. 5 is a perspective, graphical illustration of an engineering mock-up of a wing for an aircraft, illustrating dihedral motion of the wing.

FIG. 5 is a graphical depiction of an engineering mockup of a wing 26 with a span 22. In this illustration, a point 68 is defined in relation to the wing 26. If the wing 26 is changed in its shape according to a dihedral morphology 20, the point 68 will move upwardly arrow 70 or downwardly along arrow 72. As noted above, this motion is akin to a flapping motion.

With reference to FIGS. 2-5, it is understood that the points 42, 56, 62, 68 will not follow the exact trajectories identified. For an actual wing, it is understood that the points 42, 56, 62, 68 will also move in other directions depending upon the morphology employed. However, FIGS. 2-5 are provided to illustrate the basic concepts underlying the four morphologies 14, 16, 18, 20 described herein.

Figure 6:
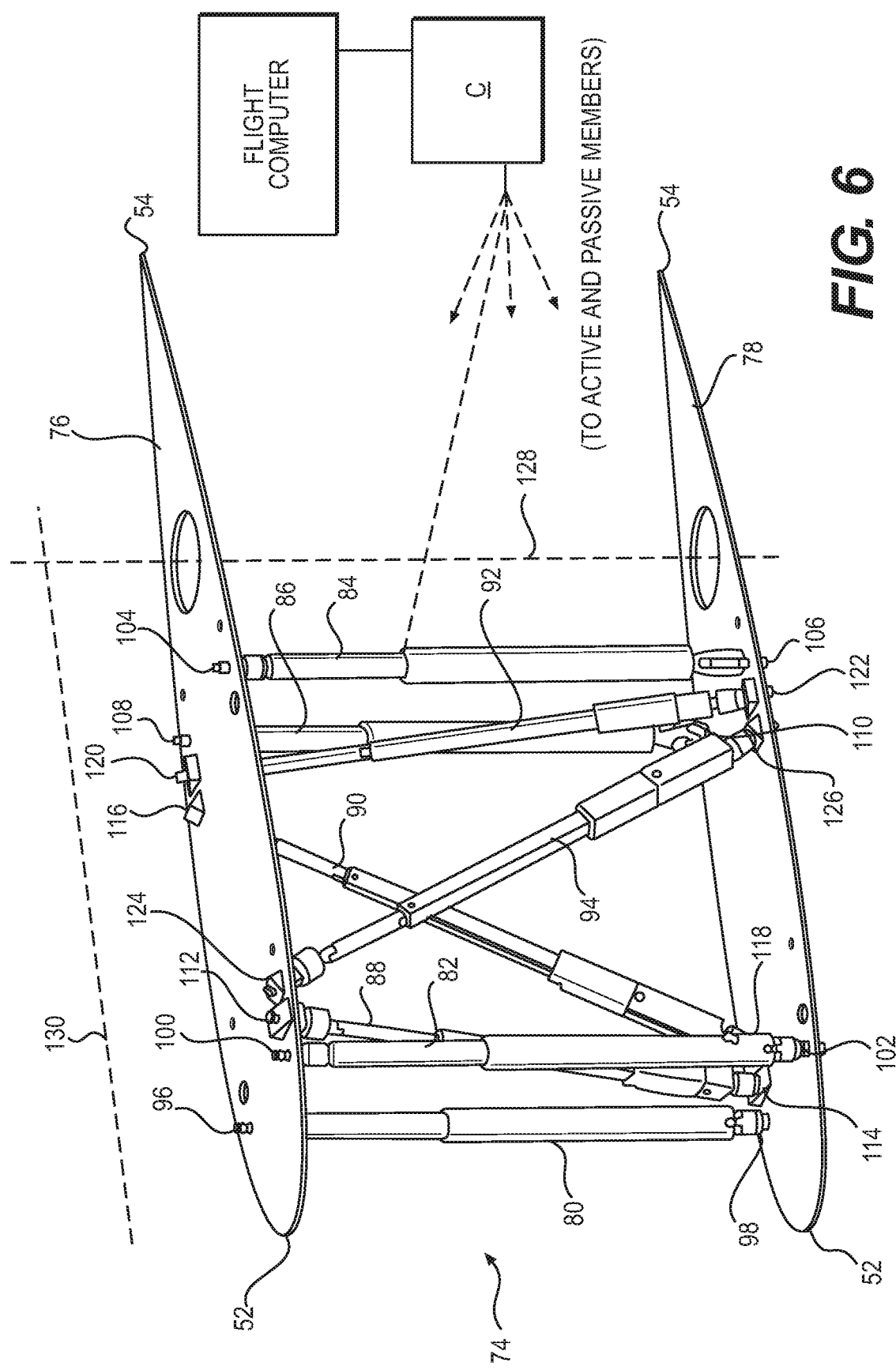
FIG. 6 is a perspective view of a module permitting adjustable wing morphologies.

FIG. 6 illustrates one embodiment of a module 74 permitting adjustable wing morphologies 14, 16, 18, 20. The module 74 is understood to be incorporated into a wing 26 of an aircraft 10 so that the wing 26 may change its shape according to one or more of the identified morphologies 14, 16, 18, 20.

The module 74 includes a first rib 76 and a second rib 78. (It is noted that the terms "spar," "plate," or "structural plate" may be substituted for the term "rib," because the terms are considered to be interchangeable in the context of the present invention.) As should be recognized by those skilled in the art, an aircraft wing 26 will include a plurality of ribs 76, 78 vertically arranged, at predetermined structural positions, within the wing 26. The ribs 76, 78 are understood to be vertically oriented with respect to the wing and to extend from the leading edge 52 to the trailing edge 54 of the wing 26. The ribs 76, 78 are structural members that form part of the interior structure of the wing 26.

As should be apparent to those skilled in the art, the ribs 76, 78 are understood to be made from aluminum or an alloy thereof. While this is the likely material for the ribs 76, 78, the ribs 76, 78 may be made from any suitable material. For example, the ribs 76, 78 may be made from iron, steel, or an alloy or iron or steel. Alternatively, the ribs 76, 78 may be made from a material that includes a lightweight metal such as magnesium and its associated alloys.

In still further contemplated embodiments, the ribs 76, 78 may be made from a non-metallic material, such as a composite material. A composite may include a material made from a resin-impregnated fiber, such as carbon fiber, or the like. The precise material used for the ribs 76, 78 is not critical to operation of the module 74. Accordingly, any suitable material may be employed, as should be apparent to those skilled in the art.

The module 74 that is illustrated in FIG. 6 includes a total of eight members. Four of the members are passive members 80, 82, 84, 86. Four of the members are active members 88, 90, 92, 94. All eight members connect between the ribs 76, 78. While eight members are illustrated, the module 74 may include any number of active or passive members.

The passive member 80 extends between a position 96 on the rib 76 to a position 98 on the rib 78. The passive member 82 extends between a position 100 on the rib 76 to a position 102 on the rib 78. The passive member 84 extends between a position 104 on the rib 76 to a position 106 on the rib 78. The passive member 86 extends between a position 108 on the rib 76 to a position 110 on the rib 78.

Similarly, the active member 88 extends between a position 112 on the rib 76 to a position 114 on the rib 78. The active member 90 extends between a position 116 on the rib 76 to a position 118 on the rib 78. The active member 92 extends between a position 120 on the rib 76 to a position 122 on the rib 78. The active member 94 extends between a position 124 on the rib 76 to a position 126 on the rib 78.

An active member 88, 90, 92, 94 is contemplated to be a member that is capable of exerting a force between the ribs 76, 78 in a direction along a longitudinal axis of the active member 88, 90, 92, 94. Specifically, it is contemplated that be active members 88, 90, 92, 94 will be telescoping members that may either expand or contract depending upon the input signals provided thereto. The active members 88, 90, 92, 94 may be hydraulically activated, pneumatically activated, electromechanically activated, activated by SMAs, and/or the like.

The passive members 80, 82, 84, 86 are contemplated to be responsive to the motions generated by the active members 88, 90, 92, 94, which motions are transmitted to the passive members 80, 82, 84, 86 via the ribs 76, 78. It is not contemplated that the passive members 80, 82, 84, 86 will exert any force actively on the ribs 76, 78. To the contrary, the passive members 80, 82, 84, 86 are contemplated to respond to changes in the orientation of the ribs 76, 78 as a result of the activation of the active members 88, 90, 92, 94.

As should be apparent from the depiction of the module 74 in FIG. 6, the active members 88, 90, 92, 94 are disposed such that they are oriented at an angle with respect to a lateral axis 128 defined by the span 22 of the wing and/or at an angle with respect to a longitudinal axis 130 defined between the leading edge 52 and the trailing edge 54 of the wing 26. The angle is contemplated to fall within a range of 0±90° to the lateral axis. It is noted that the lateral axis 128 is parallel to the lateral axis of the aircraft 10. The longitudinal axis 130 is parallel to the longitudinal axis of the aircraft 10. While this convention is adopted for clarification, the lateral axis 128 and the longitudinal axis 130 need not be oriented in any specific manner with respect to the aircraft 10. For that matter the orientations of the active members 88, 90, 92, 94 are not considered to be critical to the construction and/or operation of the wing 24, 26.

The passive members 80, 82, 84, 86 are disposed such that they are essentially parallel to the lateral axis 128 (e.g., at an angle of 0° with respect to the lateral axis). The passive members 80, 82, 84, 86 are also essentially parallel to one another. It is noted that, while the passive members 80, 82, 84, 86 are shown as being parallel to the lateral axis 128, this arrangement is not required for the construction and/or operation of the wing 26. Alternatively, it is contemplated that the passive members 80, 82, 84, 86 may be angled with respect to one or both of the lateral axis 128 and/or the longitudinal axis 130.

In the module 74, the active members 88, 90, 92, 94 and the passive members 80, 82, 84, 86 are connected between the ribs 76, 78 such that the attachment points are grouped in a specific manner. As illustrated, the connection points establish the corners of a rectangle on each of the ribs 76, 78. While this arrangement is consistent with the illustrated embodiment, other arrangements may be employed in the alternative. For example, the connection points may establish the corners of a trapezoid, parallelogram, or other polygon, as appropriate for the module 74 employed.

With reference to the module 74 illustrated in FIG. 6, the passive members 80, 84 define two of the corners of the rectangle defined by the connection points 96, 104 on the rib 76. The other two corners of the rectangle on the rib 76 are occupied by three connection points, one each for the associated active members and one each for the associated passive members.

As should be apparent, each of the corners of the rectangle defined by the connection points on the rib 76 is effectively identified by the connection points 96, 100, 104, 108 between the passive members 80, 82, 84, 86 and the rib 76. Similarly, each of the corners of the rectangle defined by the connection points on the rib 78 is effectively identified by the connection points 98, 102, 106, 110 between the passive members 80, 82, 84, 86 and the rib 78.

As illustrated, the active members 88, 90, 92, 94 are oriented such that the active members 88, 90, 92, 94 connect adjacent to one another at opposing corners of the rectangle defined on the rib 76. The same is true for the rib 78, except that the corners are the opposite of those identified on the rib 76. As noted above, this particular arrangement of components reflects the contemplated embodiment of the module 74 that is illustrated in FIG. 6. It is contemplated that the active members 88, 90, 92, 94 and the passive members 80, 82, 84, 86 may be positioned in a different arrangement.

As should be apparent from the module 74 that is illustrated in FIG. 6, the cross-wise connection between the active members 88, 90, 92, 94 and the ribs 76, 78 permit the active members 88, 90, 92, 94 to tilt the ribs 76, 78 in any direction with respect to one another. Moreover, the active members 88, 90, 92, 94 do not interfere with one another mechanically when their respective orientations are altered.

The active members 88, 90, 92, 94 in the embodiment illustrated in FIG. 6 are contemplated to be linear actuators, the operation of which is controlled using magnetic and/or electromagnetic forces. As indicated above, however, any other type of control may be employed in the alternative. For example, control may be hydraulic, pneumatic, and/or via SMAs.

The passive members 80, 82, 84, 86 are contemplated to be linear bearings or some other suitable telescoping member. The passive members are contemplated to be stiffening devices. Specifically, the passive members are contemplated to remain in a fixed, static orientation after being adjusted in cooperation with the active members 88, 90, 92, 94.

With continued reference to FIG. 6, the operation of the module 74 will now be described.

The active members 88, 90, 92 94 are contemplated to be linear actuators that are electromechanically actuated. In other words, application of an electrical, magnetic, or electromagnetic signal to the active members 88, 90, 92, 94 is contemplated to instruct the active members 88, 90, 92, 94 to change a length thereof. Specifically, the active members 88, 90, 92, 94 receive signals, as input, that instruct the active members 88, 90, 92, 94 to extend or retract to a required length. This motion, in turn, will cause the ribs 76, 78 to change in their respective orientations.

As illustrated in FIG. 6, the active members 88, 90, 92, 94 are positioned diagonally with respect to the lateral axis 128 and the longitudinal axis 130. The active members 88, 90, 92, 94 apply appropriate forces to alter the angular positions of the ribs 76, 78 with respect to one another.

The passive members 80, 82, 84, 86, on the other hand are not activated, such that they actively apply any forces to the ribs 76, 78. Instead the passive members 80, 82, 84, 86 merely extend or contract along with the movement of the ribs 76, 78 upon which the active members 88, 90, 92, 94 operate. Alternatively, the passive members 80, 82, 84, 86 may remain in a static position depending upon the positional relationship between the ribs 76, 78.

With this arrangement of active and passive members, it is possible to change the orientation of the ribs 76, 78 with respect to one another. When the module is installed in a wing 26, it is then possible to alter the shape of the wing 26 according to one or more of the shape morphologies 14, 16, 28, 20 discussed above, because the wing 26 incorporates the module 74, which changes the shape of the wing 26 according to inputs provided to the active members 88, 90, 92, 94.

So that the module retains a rigid shape in the event that the active members 88, 90, 92, 94 lose the ability to receive signals, it is contemplated that at least the passive members 80, 82, 84, 86 will incorporate a mechanism by which the passive members 80, 82, 84, 85 are locked in a rigid state.

Ian one contemplated embodiment, the passive members 80, 82, 84, 86 may include self-circulating valves. According to this embodiment, the passive members 80, 82, 84, 86 may be hydraulic pistons having two interior chambers that are fluidically connected to one another via a self-circulating valve. When the self-circulating valve is open, fluid is permitted to flow freely between the two chambers within the passive members 80, 82, 84, 86. As a result, when the self-circulating valve is opened, the passive members 80, 82, 84, 86 are pliant and will experience changes in length depending upon associated changes in the configuration of the ribs 76, 78 to which they are attached.

When the self-circulating valve is closed, however, the fluid in the two chambers within the passive members 80, 82, 84, 86 cannot circulate. As a result, when the self-circulating valve is closed, the passive members 80, 82, 84, 86 become rigidly fixed. In other words, when the self-circulating valve is closed, the lengths of the passive members 80, 82, 84, 86 cannot be changed. In this manner, by closing the self-circulating valve, the passive members 80, 82, 84, 86 transform into rigid, structural members within the wing 26. As such, the passive members 80, 82, 84, 86 are lockable in a particular position to fix the wing 26 in a predetermined orientation. The passive members 80, 82, 84, 86 may be locked by any means, including but not limited to self-circulating valves or mechanical brakes.

It is rioted that one embodiment also contemplates that the active members 88, 90, 92, 94 may include self-circulating valves so that the active members 88, 90, 92, 94 may be locked into specific orientations in the same manner as the passive members 80, 82, 84, 86.

The lockability of the passive members 90, 82, 84, 86 (and, alternatively, also the active members 88, 90, 92, 94) is required for operation of the module 74. Since the module 74 will be incorporated into the wing 26, it is important to make sure that the wing 26 will retain a rigid configuration during operation. This is especially important if all power is lost to the active members 88, 90, 92, 94 and the passive members 80, 82, 84, 86. In the instance where power is lost, the lockability of the passive members 80, 82, 84, 86 (and also some or all of the active members 88, 90, 92, 94) will maintain the wing 26 in a rigid orientation.

Without limitation, it is noted that the active members 88, 90, 92, 94 alternatively may be electromechanically operated, hydraulically operated, pneumatically operated, and/or operated via a shape memory alloy ("SMA"). Similarly, the active member 88, 90, 92, 94 may be locked electromechanically, hydraulically, pneumatically, and/or via a SMA. Similarly, it is contemplated that the passive members 80, 82, 84, 86 alternatively may be operated and locked electromechanically, hydraulically, pneumatically, and/or via a SMA.

With continued reference to FIG. 6, the connections between the active members 88, 90, 92, 94 and the passive members 80, 82, 84, 86 is now discussed. Specifically, as illustrated in FIG. 6, each of the active members 88, 90, 92, 94 and the passive members 80, 82, 84, 86 are connected between the ribs 76, 78 with suitable fasteners. For example, the fasteners may be screw and nut type fasteners. Alternatively, the active members 88, 90, 92, 94 and the passive members 80, 82, 84, 86 may be attached to the ribs 76, 78 via mechanical joints, such as bearings, ball joints, or other load-bearing mechanical structures. The mechanical joints are contemplated to be attached to structural members that are connected (such as by welds) to the ribs 76, 78. In another contemplated embodiment, the ribs 76, 78 may be machined or formed to include points of attachment to the active members 88, 90, 92, 94 and the passive members 80, 82, 84, 86 and/or any mechanical joints associated therewith. In this embodiment, therefore, the structural members that provide points of attachment are integral to the ribs 76, 78. As should be apparent, however, the type of fastener and the joint forming the connection is not critical and any suitable alternative fastener and/or joint may be employed.

Figure 7:
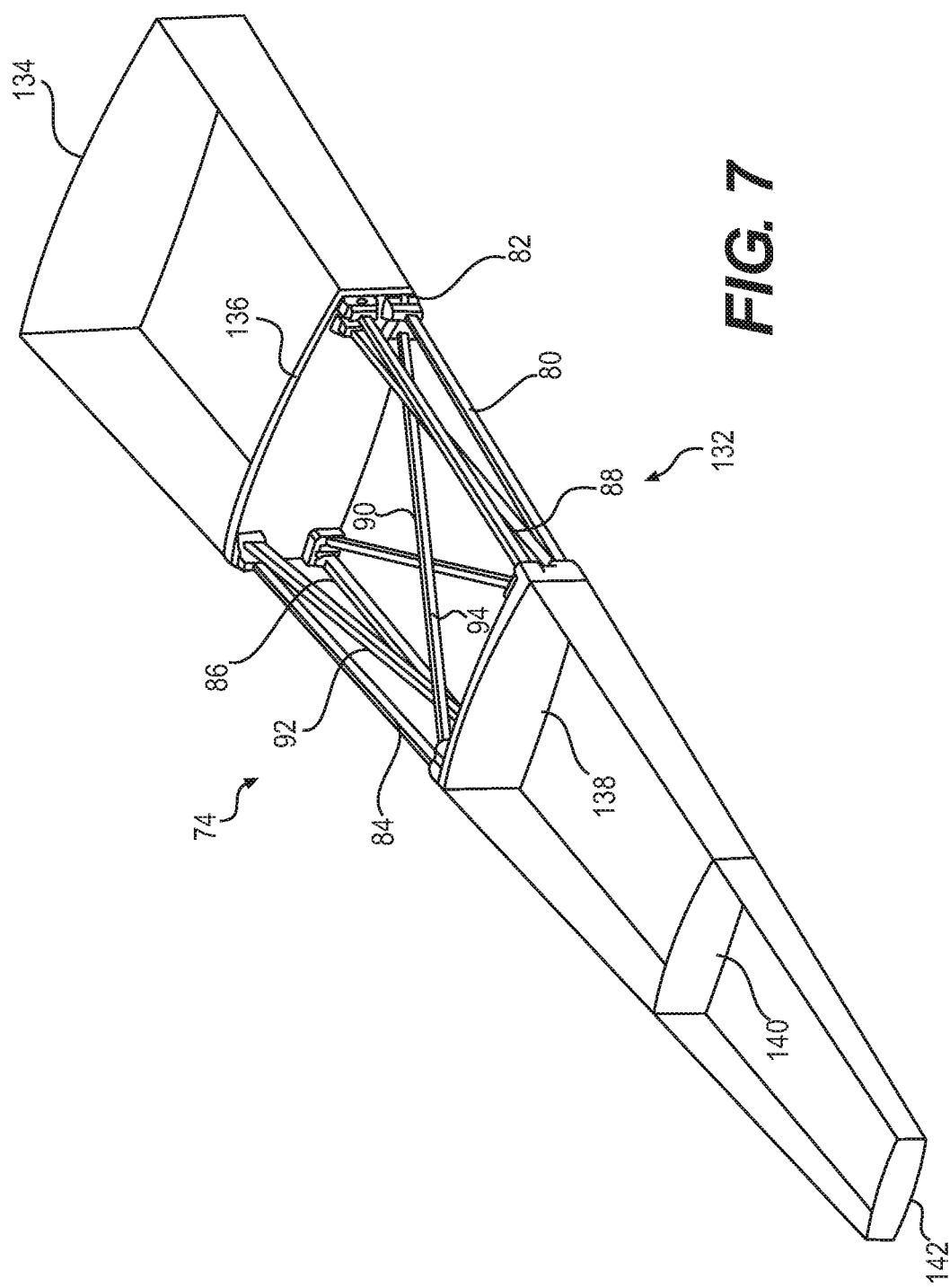
FIG. 7 is a perspective illustration of one module of the morphing wing.

FIG. 7 is a perspective, graphical illustration of a wing 132 according to another embodiment. The wing 132 includes five ribs 134, 136, 138, 140, 142 that are spaced along the interior of the wing 132. A module 74 is disposed between adjacent ribs 136 and 138. As noted above, when the active members 88, 90, 92, 94 are operated, the ribs 136, 138 will change in their respective orientations. This will result a change in the shape of the wing 132 according to one or more of the identified morphologies 14, 16, 18, 20.

Figure 8:
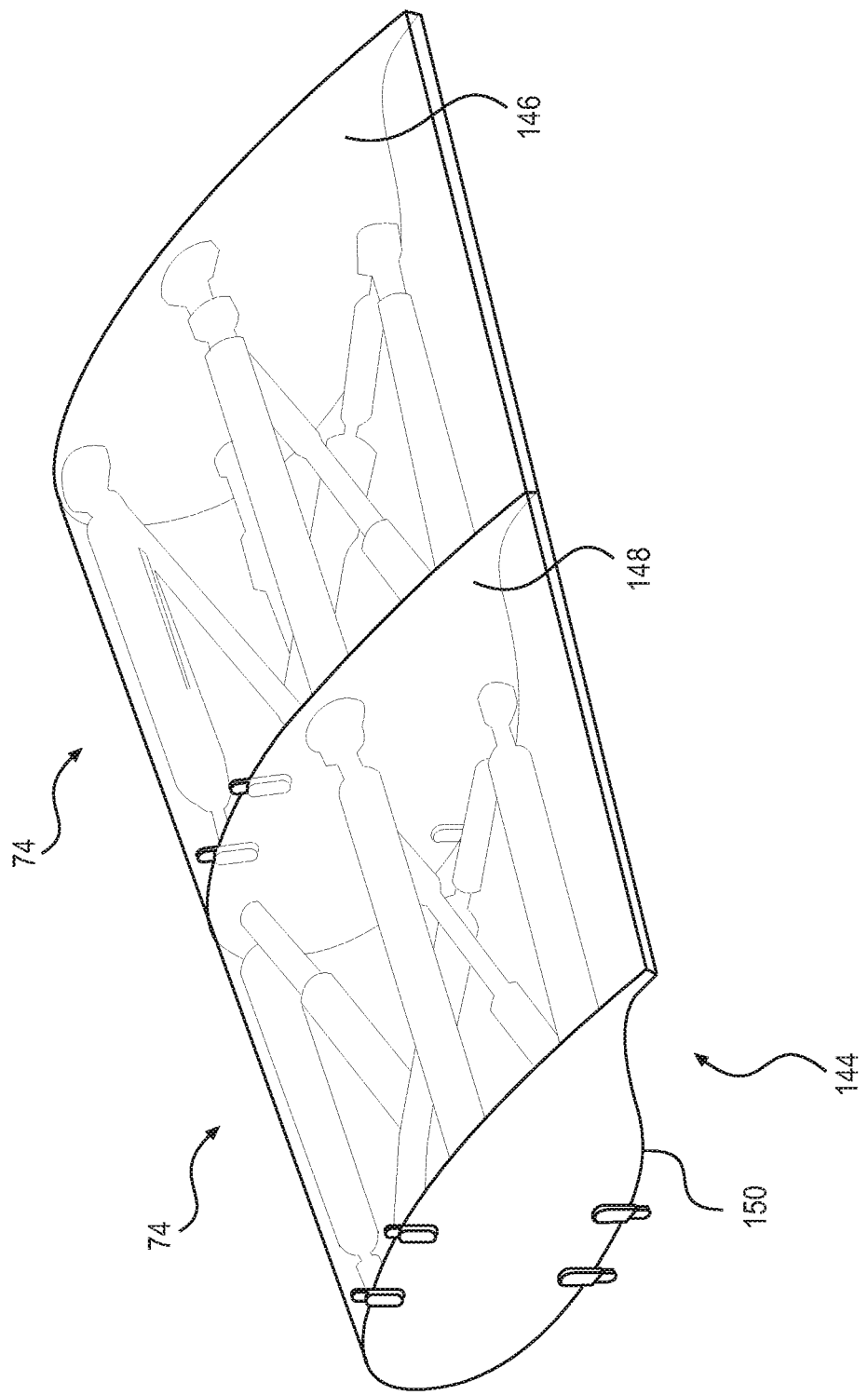
FIG. 8 is a perspective, graphical illustration of two adjacent modules of the morphing wing.

FIG. 8 is a perspective illustration of two modules 74 spaced side-by-side in part of a wing 144. In this illustration, there are three ribs 146, 148, 150. The two modules 74 share the center rib 146. When modules 74 are connected in this manner it is possible to enhance the morphing condition of the wing 144. In this embodiment, each module 74 makes an incremental change to the shape of the wing 144. As such, a larger, overall shape change is possible from root to tip of the wing 144.

Figure 9:
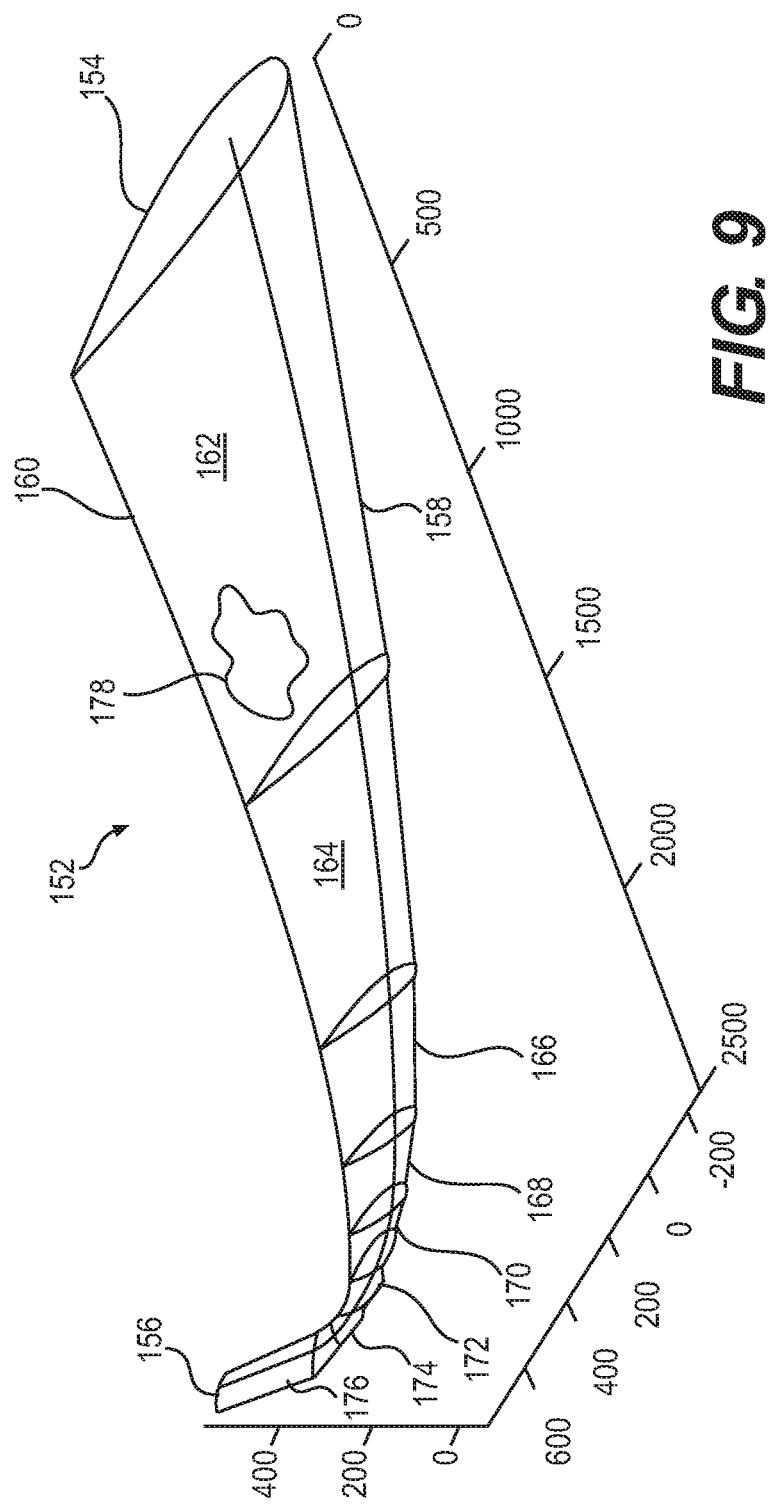
FIG. 9 is a graphical illustration of a morphing wing, in a dihedrally morphed condition, relying on a plurality of the modules.

FIG. 9 is graphical illustration of a wing 152. The wing 152 defines a root 154, a tip 156, a leading edge 158 and a trailing edge 160. There are eight separate modules 162, 164, 166, 168, 170, 172, 174, 176 disposed between the root 154 and the tip 156 of the wing 152. Adjacent modules share a common rib with their neighboring modules.

With respect to FIG. 9, it is noted that each module 162, 164, 166, 168, 170, 172, 174, 176 may have a slightly different size and orientation in the wing 152.

With renewed reference to FIG. 2, the operation of one or modules 74 in span morphology 14 is contemplated to permit the wing 24, 26 to alter its span 22 within a range of 0-25% of its shortest length. In other words, it is contemplated that the span 22 may be increased by up to 25% of the original (shortest) span 22. In another contemplated embodiment, the change in wing span 22 is contemplated to fall within a range of 0-20%. Further, the range may be 0-15%. Still further the range may be 0-10%. Finally, it is contemplated that the change in the wing span 22 may fall within a range of 0-5%. In further contemplated embodiments, the lower limit for the ranges may be 5%, 10%, or 15%. As such, for example, one contemplated range for the change in wing span 22 that is made possible by employing one or more modules 74 is a range of 5-10%.

With reference to FIG. 3, which illustrates the twist morphology 16, the degree of the angle of twist is contemplated to fall within a range of ±45° from an initial position for the wing 24, 26. In other contemplated embodiments, the range is ±40°, ±35°, ±30°, ±25°, ±20°, ±15°, ±10°, and/or ±5°. Other permutations of these ranges also are contemplated. For example, the wing 24, 26 may be permitted to twist will a range of −10° to −25°.

With reference to FIG. 4, which illustrates the sweep morphology 18, operation of one or more modules 74 is contemplated to alter the location of the tips 50 of the wings 24, "sweep") within a range of ±45° from the initial position. In other words, it is contemplated that tips 50 of the wings 24, 26 may move forwardly (a positive angle) or rearwardly (a negative angle) within a range of ±45°. In other contemplated embodiments, the range is ±40°, ±35°, ±30°, ±25°, ±20°, ±15°, ±10° and/or ±5°. Other permutations of these ranges also are contemplated. For example, the tip 50 of the wing 24, 26 may be permitted to sweep within a range of +10° to 15°.

With reference to FIG. 5, which illustrates the dihedral morphology 20, the degree of the angle of deviation from an initial position is contemplated to fall within a range of ±45° for the wing 24, 26. A positive change refers to movement of the wing upwardly from the initial position. A negative change refers to movement of the wing downwardly from the initial position. In other contemplated embodiments, the range is ±40°, ±35°, ±30°, ±25°, ±20°, ±15°, ±10°, and/or ±5°. Other permutations of these ranges also are contemplated. For example, the wing 24, 26 may be permitted to engage in a dihedral variation within a range of +10° to −20°.

With continued reference to FIG. 6, a controller C is illustrated. The controller C is contemplated to be connected electrically to the active members 88, 90, 92, 94 and the passive members 80, 82, 84, 86 in a manner that provides independent control over each of the members. The controller C is understood to receive commands from a flight computer on board the aircraft 10. The flight computer is understood to analyze the flight conditions for the aircraft 18 and compute an optimal configuration for the wings 24, 26 in any of the four morphologies 14, 16, 18, 20 discussed above.

The flight computer will then provide the parameters for a particular wing configuration to the controller C. The controller C will then calculate a configuration for the active members 88, 90, 92, 94 and the passive members 80, 82, 84, 86 that satisfies the output conditions provided from the flight computer.

It is noted that a separate controller C is not required. The controller C may be incorporated into the flight computer or any other processor that is available on the aircraft 10.

In one further contemplated embodiment, the wing 24, 26 may be morphed using a routed actuation system that incorporates, for example, cables, struts, and pulleys. This differs from the embedded actuation that is described above.

As should be apparent, the wing 24, 26 also will require an external skin 178 disposed thereon, as indicated in FIG. 9. Since the wing 24, 26 morphs, the skin 178 is contemplated to be made from a material that permits the different morphologies 14, 16, 18, 20.

In one contemplated embodiment, the morphing aircraft skin 178 may be flexible. It is contemplated that the skin 178 may be made from a metallic material, a composite material, and/or a SMA.

In another contemplated embodiment, the morphing aircraft skin 178 may be made of a number of rigid scales (akin to fish scales) that are provided in an overlapping manner. The scales are understood to move in relation to one another while maintaining a continuous outer surface for the wing 24, 26 so that the wing 24, 26 provides sufficient lift.

In a further embodiment, the morphing aircraft skin 178 may be made from a number of slats that are arranged, like louvers in a venetian blind, so that they overlap one another and move with respect to one another.

Figure 10:
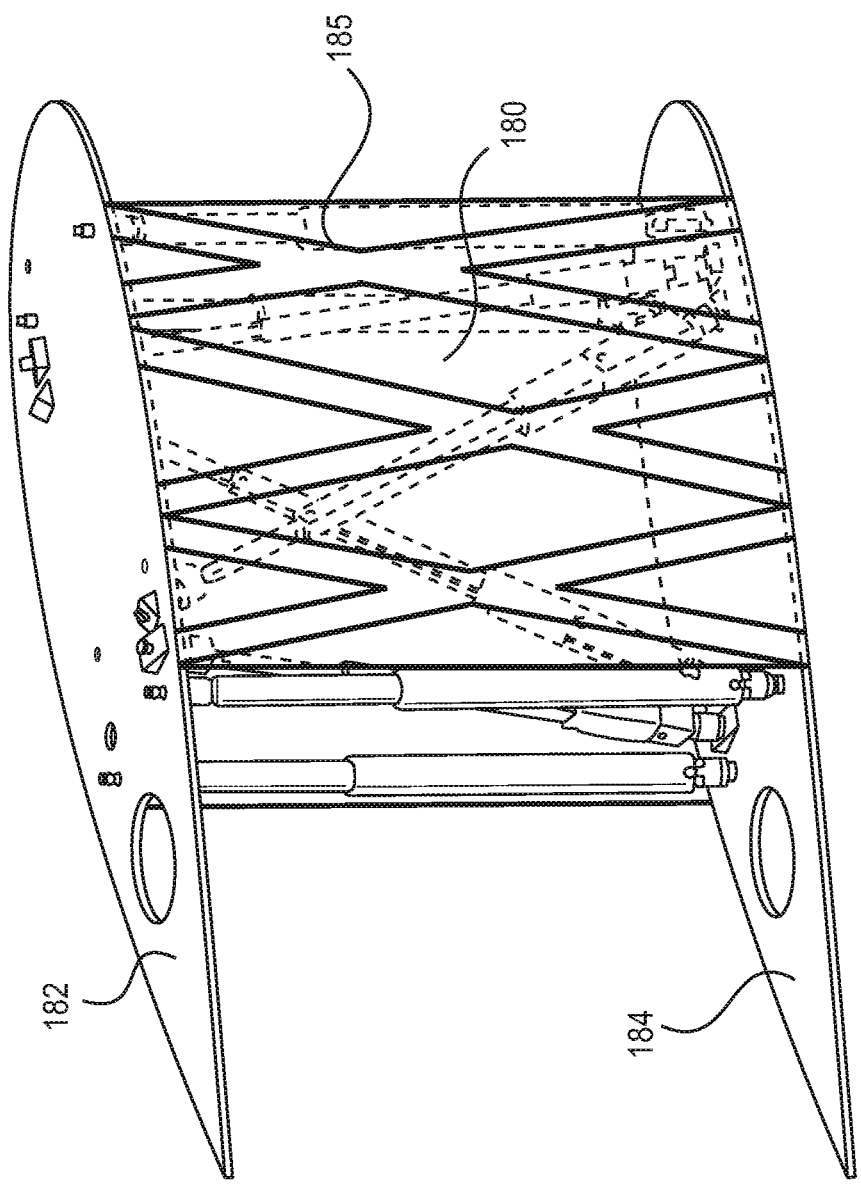
FIG. 10 is a perspective, graphical illustration of a first embodiment of a morphing aircraft skin according to the present invention, referred to herein as a "flexible skin;"

FIG. 10 is a perspective illustration of a portion of a first embodiment of a morphing aircraft skin 180 according to the present invention. This embodiment of the morphing aircraft skin 180 also is referred to as a "flexible skin."

With respect to this first embodiment of the morphing aircraft skin 180, it is contemplated that the morphing aircraft skin 180 will be applied to the surface of a wing 24, 26 or other morphing control surface. It is noted, however, that the morphing aircraft slain 180 may be employed on any surface of the aircraft 10 without departing from the scope of the present invention.

In this first embodiment, the morphing aircraft skin 180 is stretched between adjacent ribs 182, 184. The morphing aircraft skin 180 is contemplated to be made from a flexible material, thus the alternative appellation "flexible skin." In the illustrated embodiment, the flexible skin 180 is contemplated to be made from a spandex material coated and/or impregnated with latex. As may be apparent to those skilled in the art, other combinations of flexible materials may be employed without departing from the scope of the present invention.

Spandex and latex are both flexible and stretchable materials. Spandex also is referred to as elastane in the industry. Elastane is a synthetic, elastic fiber material that is a polyurethane-polyurea copolymer. Latex is a natural or synthetic material also referred to as rubber. Synthetic materials include, but are not limited to, styrene-butadiene rubber, acrylonitrile butadiene rubber, acrylic polymers, and polyvinyl acetate, among others. Elastane is contemplated to form a fabric onto which the latex is deposited or into which the latex is impregnated.

It is contemplated that a flexible skin 180 made from a combination of elastane and latex may not be sufficient to adjust to all wing morphologies 14, 16, 18, 20. In particular, while the flexible skin 180 is contemplated to be particularly well-suited for instances of tension and compression. This includes instances where the flexible skin is subjected to a span morphology 14 and/or a dihedral morphology 20. However, in stances where the flexible skin 180 is subjected to a twist morphology 16 and/or a sweep morphology 18, there remains the possibility that the flexible skin 180 may ripple. Ripples are to be avoided, because they may adversely affect the aerodynamic properties of the aircraft 10.

To resolve the problem of rippling of the flexible skin 180, it is contemplated to add elastomeric reinforcing members or strips 185 to the flexible skin 180. The elastomeric strips 185 may be incorporated into the flexible skin 180 or attached to the surface of the flexible skin 180. In the embodiment illustrated in FIG. 10, the elastomeric reinforcing members 185 are attached to the rear surface of the flexible skin 180. Alternatively, the elastomeric reinforcing members 185 may be attached to the top surface of the flexible skin 180. Still further, the elastomeric reinforcing members 185 may be sandwiched between two layers of the flexible skin 180.

The exact manner of attachment of the elastomeric reinforcing members 185 to the flexible skin 180 is not particularly important for the operation of the present invention. As noted, the elastomeric reinforcing strips 185 may be attached to the flexible skin 180 by stitching. Alternatively, the elastomeric reinforcing members 185 may be bonded to the flexible skin 180. For example, the elastomeric reinforcing members 185 may be glued to the flexible skin 180. Still further, the elastomeric reinforcing members 185 may be bonded to the flexible skin 180 via ultrasonic welding or the like. In a further contemplated embodiment, the elastomeric reinforcing members 185 may be formed with the flexible skin 180 so that the reinforcing members 185 are an integral part of the flexible skin 180. As should be apparent from the foregoing, the exact way in which the elastomeric reinforcing members 185 are incorporated into the flexible skin 180 may vary without departing from the scope of the present invention.

With respect to the elastomeric reinforcing members 185, it is also contemplated that they may be made from a string, such as an elastomeric string, like those used to thread a tennis racket. In a further embodiment, the reinforcing members 185 may include springs. Still other types of elastic reinforcing members 185 may be employed without departing from the scope of the present invention.

Figure 11:
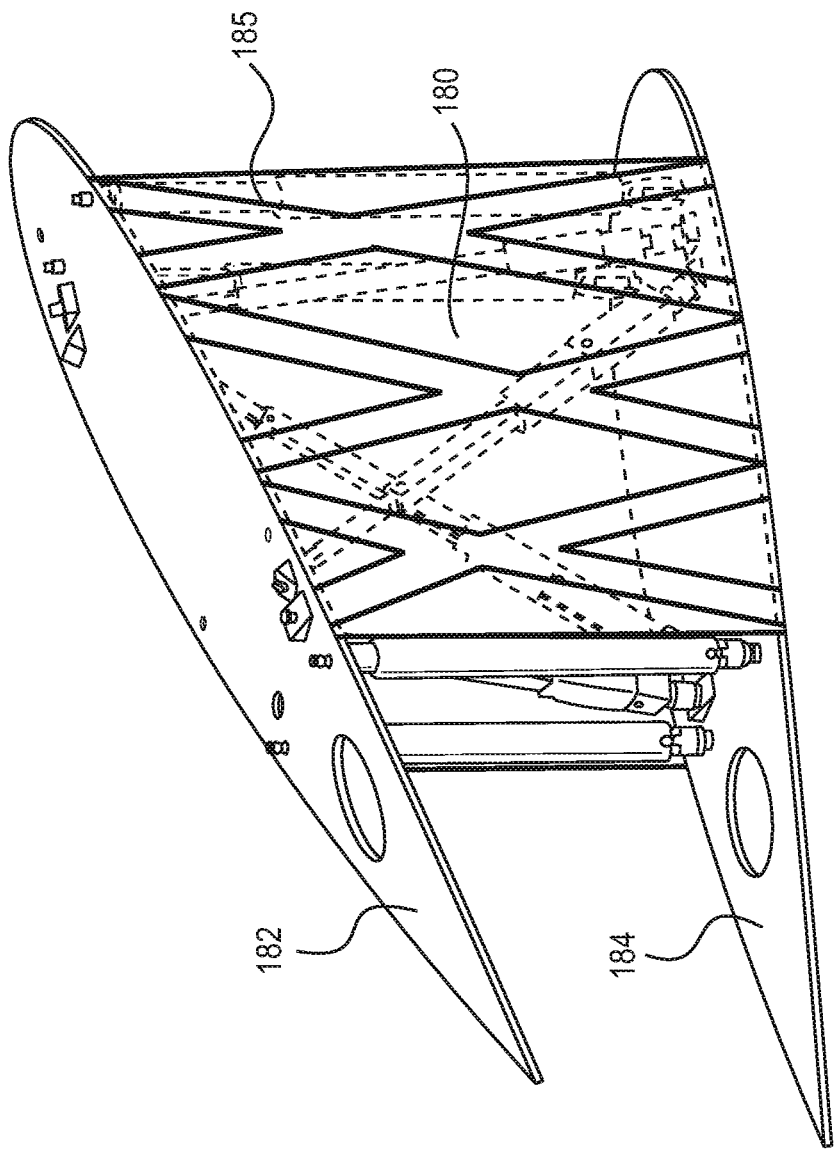
FIG. 11 is a perspective, graphical illustration of the first embodiment of the morphing aircraft skin of the present invention, showing the morphing aircraft skin in an orientation that differs from the orientation illustrated in FIG. 10.

FIG. 11 is a perspective illustration of the first embodiment of the morphing aircraft skin 180 that is illustrated in FIG. 10. In this view, the morphing aircraft skin 180 is shown in a different orientation. Specifically, the angular orientation between the ribs 182, 184 has been altered. As illustrated, however, the morphing aircraft skin 180 maintains a continuous connection between the two ribs 182, 184, which is consistent with the behavior of the flexible skin 180.

Figure 12:
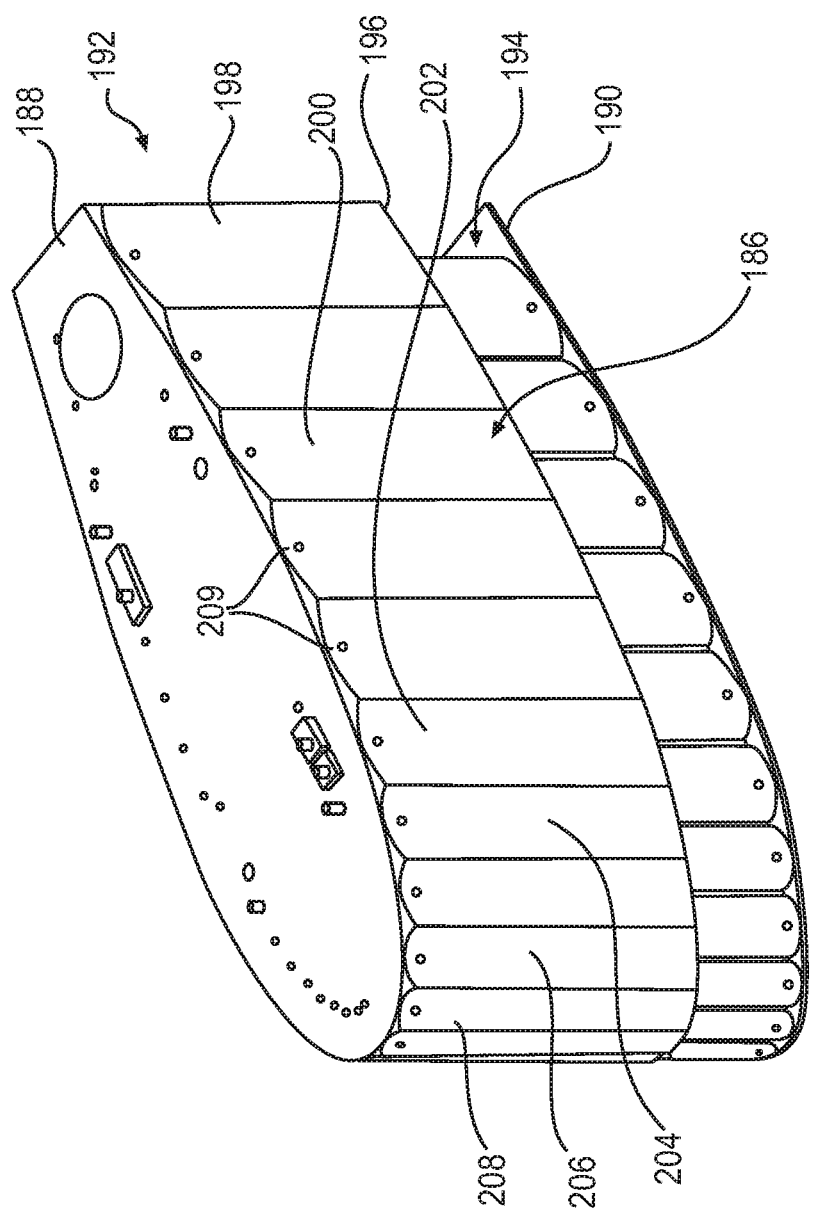
FIG. 12 is a perspective, graphical illustration of a second embodiment of morphing aircraft skin according to the present invention, referred to herein as a "sliding skin;"

FIG. 12 is a perspective illustration of a second embodiment of a morphing aircraft skin 186 according to the present invention. The morphing aircraft skin 186 also is referred to as the "sliding skin" 186. As with the morphing aircraft skin 180, the morphing aircraft skin 186 may be applied to any external surface of the aircraft 10. However, as noted, it is contemplated that the morphing aircraft skin 186 will be applied to the surface of the wings 24, 26 of the aircraft 10 or other control surfaces thereon.

In this second embodiment, the morphing aircraft skin 186 extends between adjacent ribs 188, 190. The morphing aircraft skin 186 has a first portion 192 and a second portion 194 that are separated from one another along a seam 196. The first portion is contemplated to be connected to the rib 188. The second portion 194 is contemplated to be connected to the rib 190.

As illustrated in FIG. 12, the first portion 192 overlaps the second portion 194. The bottom edge of the first portion 192 defines the seam 196. As should be apparent, the second portion 194 may overlap the first portion 192 without departing from the present invention. If the second portion 194 overlaps the first portion 192, the top edge of the second portion 194 would define the seam 196.

Each of the first and second portions 192, 194 include a plurality of individual segments, scales, or segment plates 198, 200, 202, 204, 206, 208. Each of the segments 198, 200, 202, 204, 206, 208 are contemplated to move independently of one another. In particular, segments 198, 200, 202, 204, 206, 208 are contemplated to move independently of those segments 198, 200, 202, 204, 206, 208 immediately adjacent thereto. In addition, segments 198, 200, 202, 204, 206, 208 that make up the first portion 192 are contemplated to move independently of the segments 198, 200, 202, 204, 206, 208 making up the second portion 194.

As should be apparent from FIG. 12, the segments 198, 200, 202, 204, 206, 208 have different widths, depending upon their positional placement between the ribs 188, 190. For purposes of the present invention, the segments 198, 200, 202, 204, 206, 208 may all have different sizes, the segments 198, 200, 202, 204, 206, 208 all may have the same size, or the segments 198, 200, 202, 204, 206, 208 may include a mixture of individual elements, some of which are of the same size and some of which are of different sizes.

It is contemplated that the segments 198, 200, 202, 204, 206, 208 may be constructed from a metal material, such as aluminum, an alloy of aluminum, beryllium, an alloy of beryllium, magnesium, an alloy of magnesium, iron, an alloy of iron, polymers such as plastics or rubbers, ceramics, and composite materials. Composite materials include, but are not limited to carbon fiber composite materials, composites including aramid fibers, and the like. All of the segments 198, 200, 202, 204, 206, 208 may be made from the same material. In an alternative embodiment, all of the segments 198, 200, 202, 204, 206, 208 may be made from different materials. In other words, the composition of the segments 198, 200, 202, 204, 206, 208 is not contemplated to be limited to any particular material or combination of materials.

In addition, it is contemplated that the segments 198, 200, 202, 204, 206, 208 will be made from a material that is rigid or at least semi-rigid. Any one of the materials listed above are suitable for this purpose.

It is further contemplated that the segments 198, 200, 202, 204, 206, 208 in the upper portion 192 will be joined to the segments 198, 200, 202, 204, 206, 208 in the lower portion. One possible joint includes a sandwich and channel design, as illustrated in FIG. 12. In this design, the segments 198, 200, 202, 204, 206, 208 in the upper portion 192 may include hollow, rectangular channels. The segments 198, 200, 202, 204, 206, 208 that make up the lower portion 194 are contemplated to be inserted into the rectangular channels. Other interlocking/interconnecting methods and approaches, such as those used on airport luggage carousels, may be employed without departing from the scope of the present invention.

It is noted that the segments 198, 200, 202, 204, 206, 208 are contemplated to be attached to the ribs 188, 190 so that the segments 198, 200, 202, 204, 206, 208 pivot with respect thereto. For this, pivotal connections 209 are contemplated to be provided at the ends of the segments 198, 200, 202, 204, 206, 208 adjacent to the ribs 188, 190. Any suitable connector may be employed without departing from the scope of the present invention.

Figure 13:
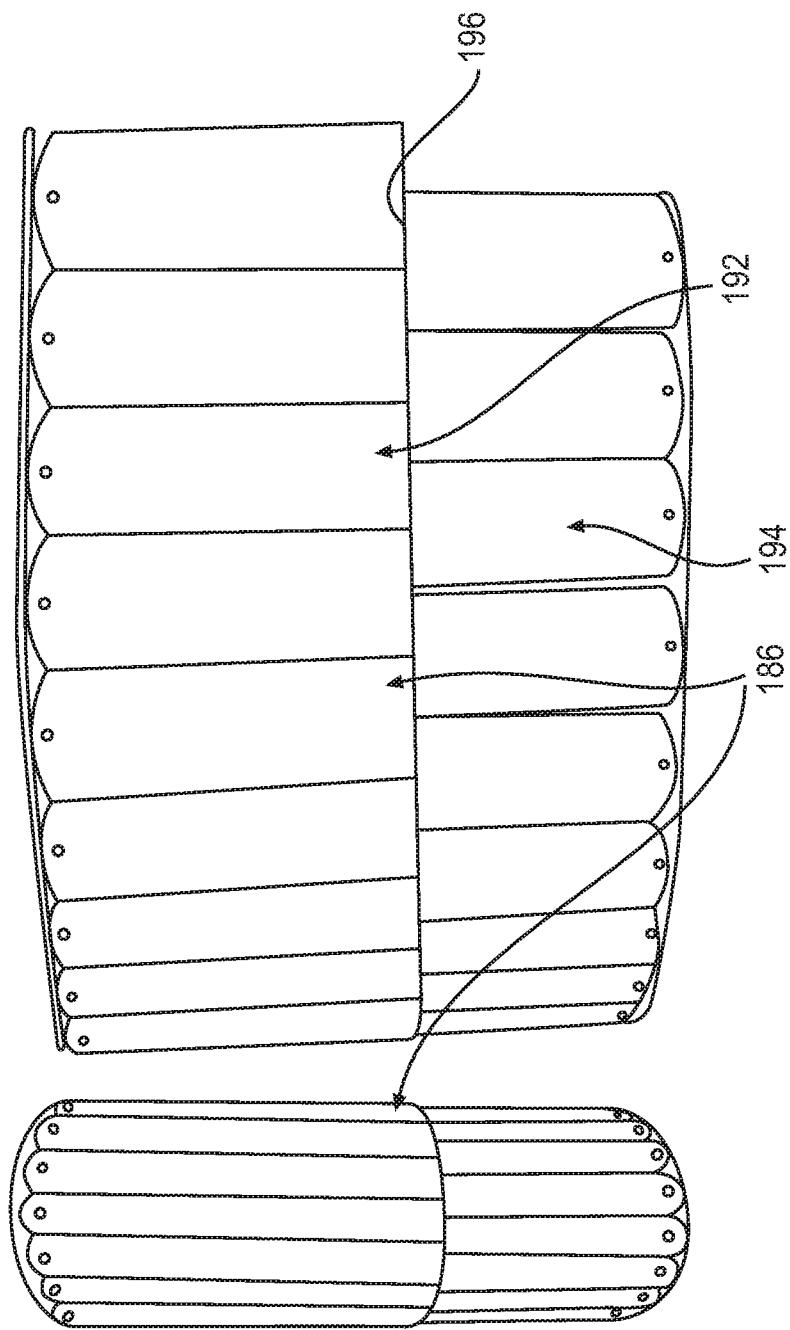
FIG. 13 is a perspective illustration of an end view and a side view of the sliding skin illustrated in FIG. 12, showing the sliding skin after a change via a span morphology.

FIG. 13 is a perspective end view and side view of the second embodiment of the morphing aircraft skin 186 illustrated in FIG. 12. In the two views illustrated in FIG. 13, the shape of the portion of the sliding skin 186 has been altered according to a span morphology 14.

Figure 14:
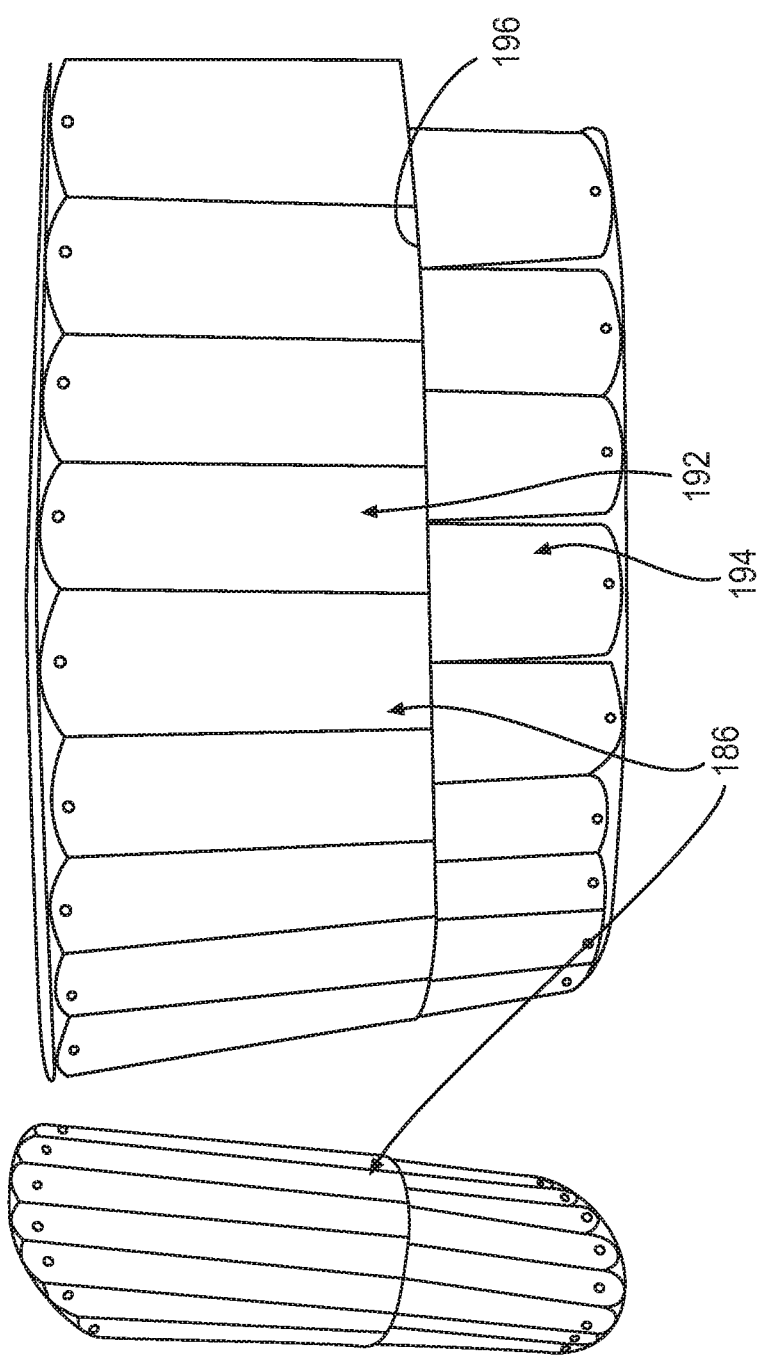
FIG. 14 is a perspective illustration of an end view and a side view of the sliding skin illustrated in FIG. 12, showing the sliding skin after a change via a twist morphology.

FIG. 14 is a perspective end view and side view of the second embodiment of the morphing aircraft skin 186 illustrated in FIG. 12. In the two views illustrated in FIG. 14, the shape of the portion of the sliding skin 186 has been altered according to a twist morphology 16.

Figure 15:
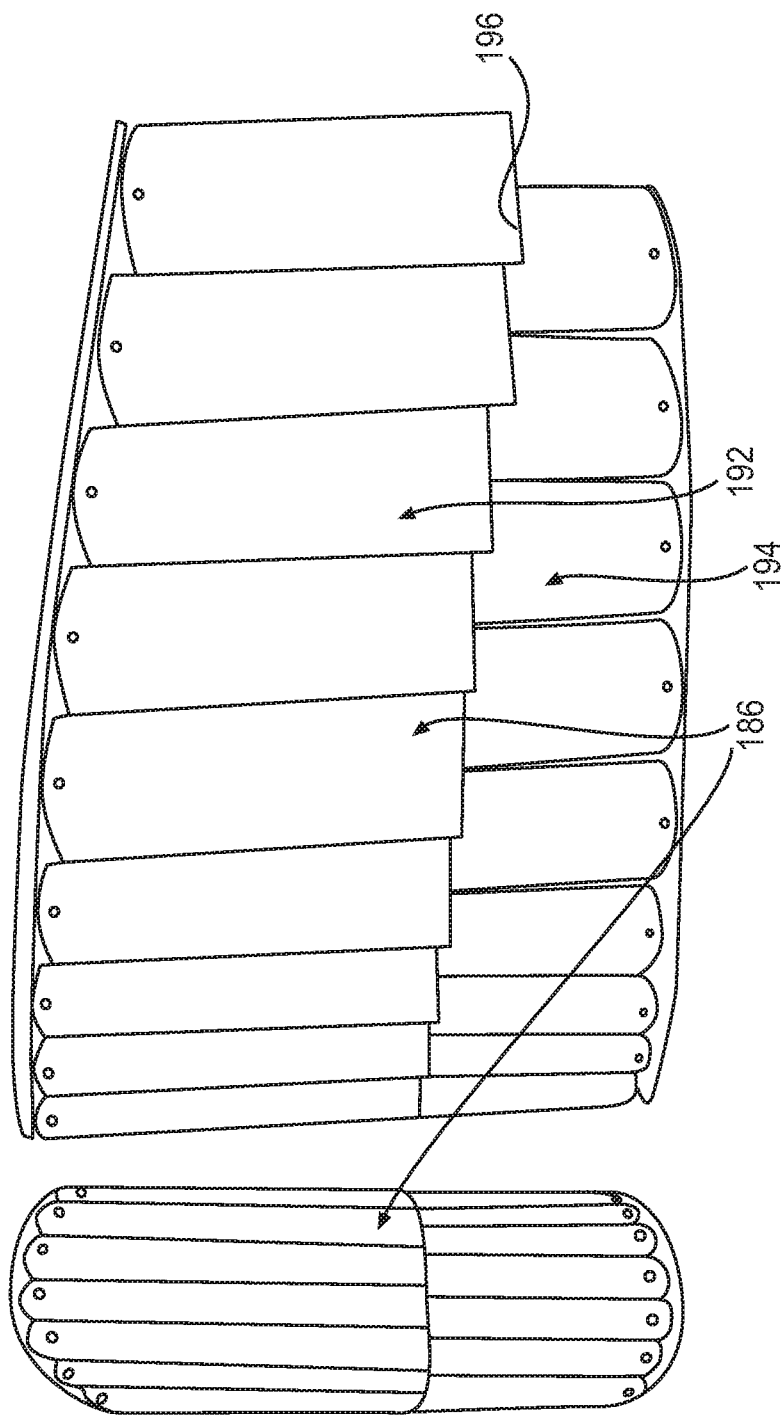
FIG. 15 is a perspective illustration of an end view and a side view of the sliding skin illustrated in FIG. 12, showing the sliding skin after a change via a sweep morphology.

FIG. 15 is a perspective end view and side view of the second embodiment of the morphing aircraft skin 186 illustrated in FIG. 12. In the two views illustrated in FIG. 15, the shape of the portion of the sliding skin 186 has been altered according to a sweep morphology 18.

Figure 16:
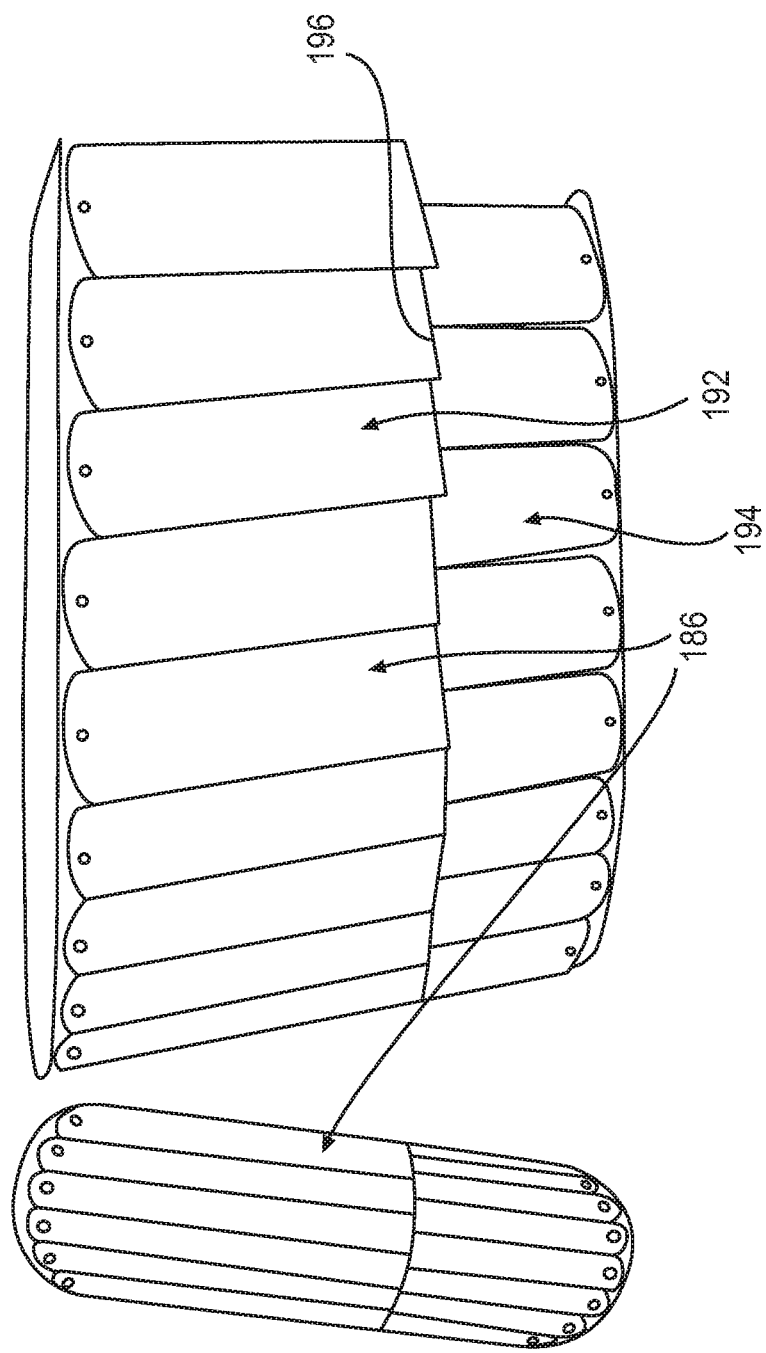
FIG. 16 is a perspective illustration of an end view and a side view of the sliding skin illustrated in FIG. 12, showing the sliding skin after a change via a dihedral morphology.

FIG. 16 is a perspective end view and side view of the second embodiment of the morphing aircraft skin 186 illustrated in FIG. 12. In the two views illustrated in FIG. 16, the shape of the portion of the sliding skin 186 has been altered according to a dihedral morphology 20.

Figure 17:
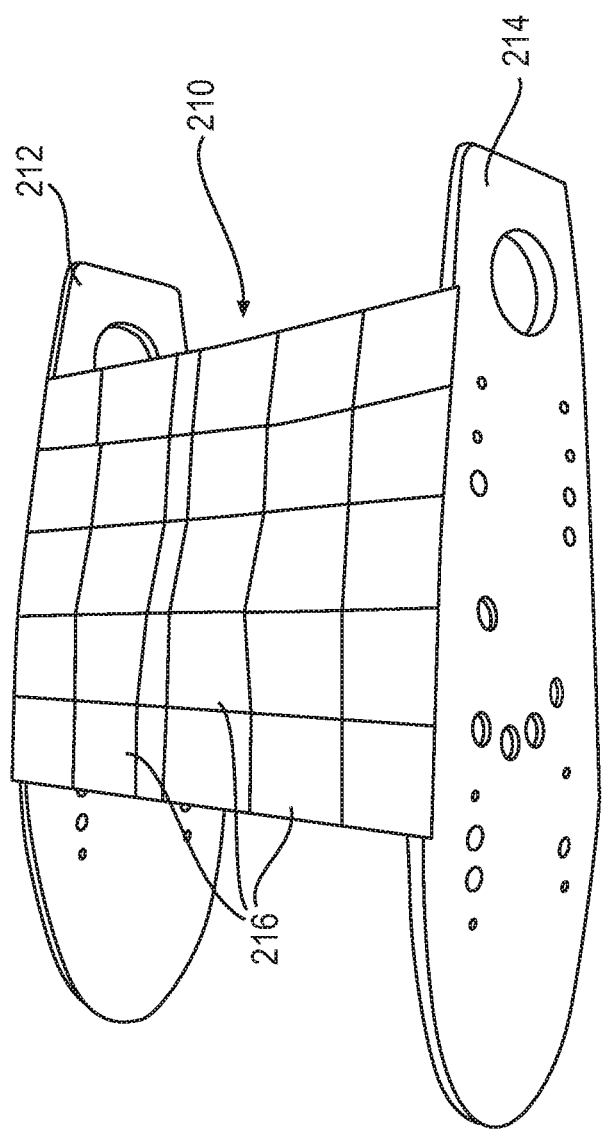
FIG. 17 is a perspective illustration of a third embodiment of a morphing aircraft skin according to the present invention, referred to herein as a "parallel hybrid skin;"

FIG. 17 is a perspective illustration of a portion of a third embodiment of morphing aircraft skin 210 according to the present invention. This embodiment also is referred to as a "parallel hybrid skin" 210.

For the portion illustrated, the morphing aircraft skin 210 extends between a first rib 212 and a second rib 214. The morphing aircraft skin 210 presents a surface that is made up of a plurality of segments 216 positioned adjacent to one another.

In this embodiment, it is contemplated that aspects of the flexible skin 180 and aspects of the sliding skin 186 may be combined together to form the parallel hybrid skin 210. As a result, the parallel hybrid skin 210 is contemplated to provide a more acceptable balance between flexibility and rigidity.

As illustrated in FIG. 17, the segments 216 that make up part of the morphing aircraft skin 210 are rectangularly-shaped and made from a rigid and/or semi-rigid material. The segments 216 may be constructed from a metal material, such as aluminum, an alloy of aluminum, beryllium, an alloy of beryllium, magnesium, an alloy of magnesium, iron, an alloy of iron, polymers such as plastics or rubbers, ceramics, and composite materials. Composite materials include, but are not limited to carbon fiber composite materials, composites including aramid fibers, and the like. All of the segments 216 may be made from the same material. In an alternative embodiment, all of the segments 216 may be made from different materials. In other words, the composition of the segments 216 is not contemplated to be limited to any particular material or combination of materials.

In one contemplated embodiment of the morphing aircraft skin 210, the segments may be placed upon and attached to a flexible skin 180. Any suitable attachment is contemplated to fall within the scope of the present invention.

Figure 18:
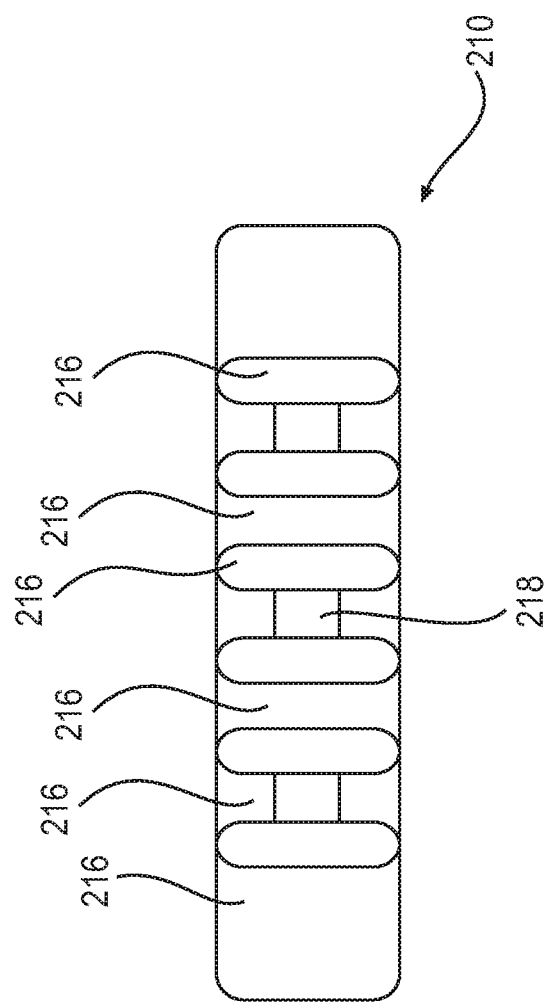
FIG. 18 is a graphical, top view of a portion of the parallel hybrid skin illustrated in FIG. 17.

FIG. 18 provides a graphical top view of a portion of the morphing aircraft skin 210 illustrated in FIG. 17. Here, individual segments 216 are connected to an elastic strip 218. The elastic strip 218 may have the same properties as the flexible skin 180 discussed above. In particular, the elastic strip 218 is contemplated to be elastic and, therefore, permit alteration of the shape of the morphing aircraft skin 210 illustrated in FIG. 17.

As illustrated in FIG. 18, it is contemplated that individual rows of segments 216 will be connected to separate elastic strips 218. However, in an alternative embodiment, the segments 216 may be attached to a web of strips 218. Still further, the segments 216 may be attached to a continuous sheet of the flexible fabric 180. In still another contemplated embodiment, the segments 216 may be attached to a mesh made from the flexible fabric 180. Other variations also are contemplated to fall within the scope of the present invention.

Figure 19:
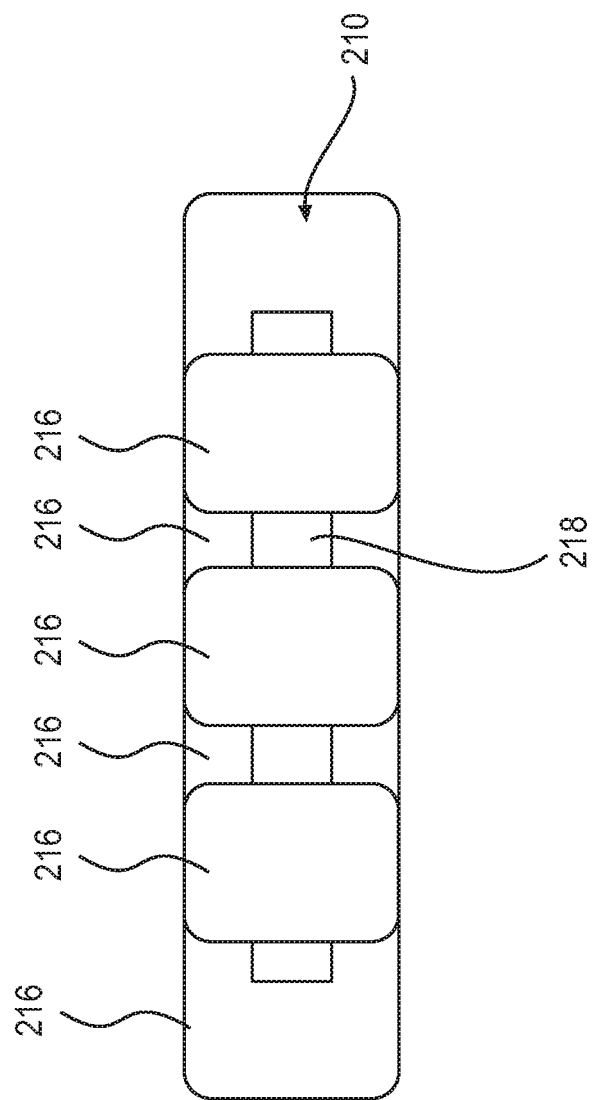
FIG. 19 is a graphical, bottom view of the portion of the parallel hybrid skin illustrated in FIG. 18.

FIG. 19 is a bottom view of the portion of the morphing aircraft skin 210 illustrated in FIG. 18. Here, the segments 216 are clearly shown as being attached to the top and bottom sides of the elastic strip 218. In the alternative, the segments 216 may be attached to only the top surface of the elastic strip 218 or the bottom surface of the elastic strip 218.

In connection with the morphing aircraft skin 210, it is contemplated that the segments 216 may be attached to the elastic strip 218 via an adhesive, such as an epoxy. Alternatively, the segments 216 may be attached to the elastic strip 218 via a suitable connector such as a fastener. Still further, it is contemplated that the segments 216 may be stitched onto the elastic strip 218. The exact method of attachment of the segments 216 to the elastic strip 218 is not considered to be limiting of the present invention as many alternatives may be employed, as should be apparent to those skilled in the art.

Figure 20:
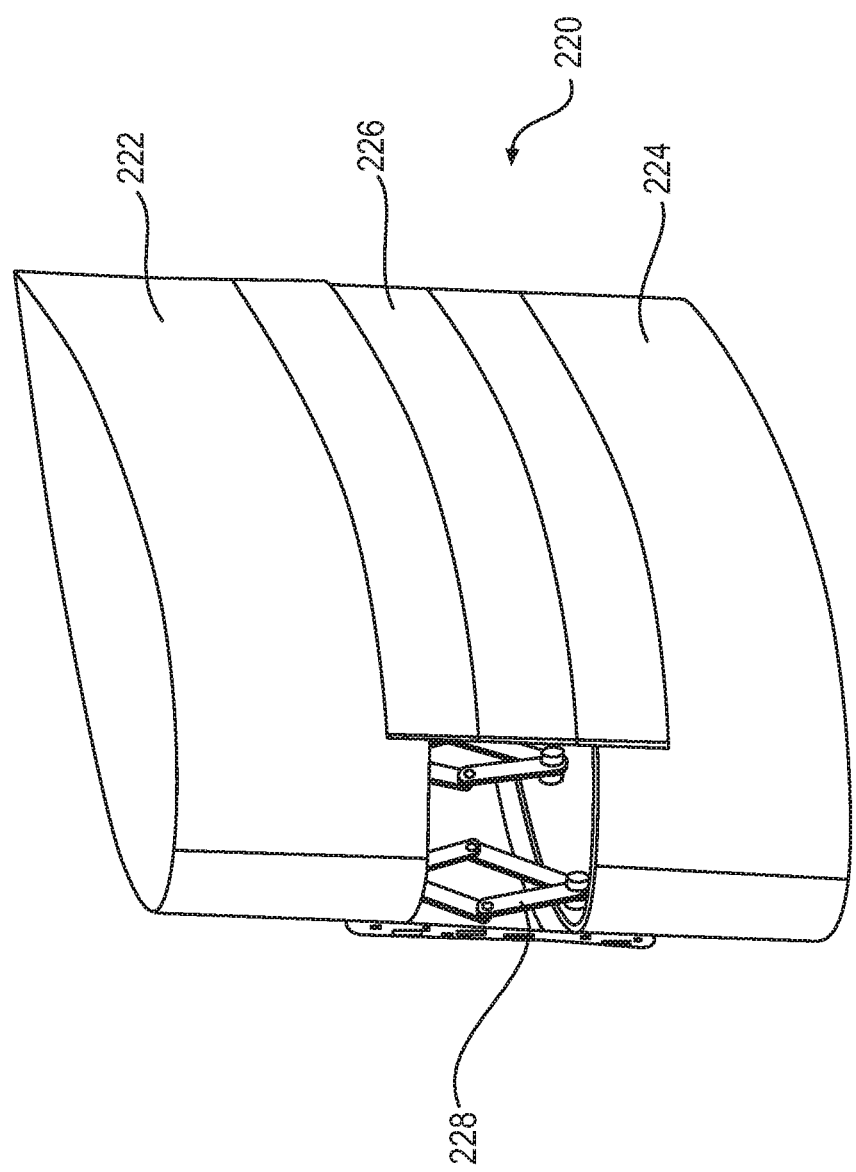
FIG. 20 is a perspective, graphical illustration of a fourth embodiment of a morphing aircraft skin according to the present invention, referred to herein as a "serial hybrid skin.

FIG. 20 is a graphical, perspective illustration of a fourth embodiment of a morphing aircraft skin 220 according to the present invention. This embodiment also is referred to as a "serial hybrid skin" 220.

The serial hybrid skin 220 includes a first skin element 222 and a second skin element 224. A third skin element 226 is sandwiched between the first skin element 222 and the second skin element 224.

Figure 21:
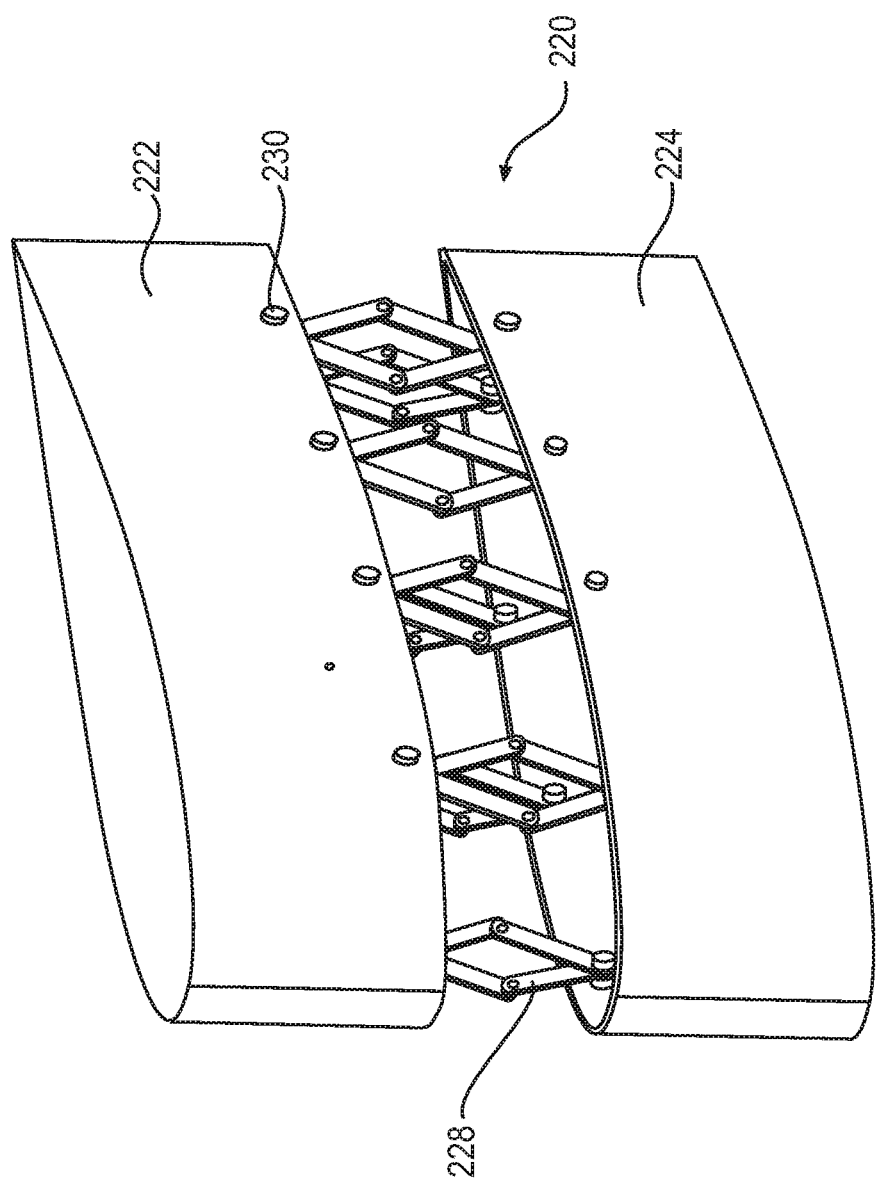
" and FIG. 21 is a perspective, graphical illustration of the serial hybrid skin shown in FIG. 20, with a portion of the serial hybrid skin removed to expose underlying details thereof.

As shown in FIGS. 20 and 21, connectors 228 extend between the first skin element 222 and the second skin element 224. In FIG. 21, the third skin element 226 has been removed to better illustrate the connectors 228.

In the embodiment illustrated, the first and second skin elements 222, 224 are contemplated to be made from a rigid and/or semi-rigid material. The skin elements 222, 224 may be constructed from a metal material, such as aluminum, an alloy of aluminum, beryllium, an alloy of beryllium, magnesium, an alloy of magnesium, iron, an alloy of iron, polymers such as plastics or rubbers, ceramics, and composite materials. Composite materials include, but are not limited to carbon fiber composite materials, composites including aramid fibers, and the like. The skin elements 222, 224 may be made from the same material. In an alternative embodiment, the skin elements 222, 224 may be made from different materials. In other words, the composition of the skin elements 222, 224 is not contemplated to be limited to any particular material or combination of materials.

In the illustrated embodiment, the third skin element 226 is contemplated to be made from the same material described for the flexible skin 180. Alternatively, the third skin element 226 may be the sliding skin 186, the parallel hybrid skin 210, or any other suitable substitute.

The connectors 228 also are contemplated to be made from a rigid and/or semi-rigid material. The connectors 228 may be constructed from a metal material, such as aluminum, an alloy of aluminum, beryllium, an alloy of beryllium, magnesium, an alloy of magnesium, iron, an alloy of iron, polymers such as plastics or rubbers, ceramics, and composite materials. Composite materials include, but are not limited to carbon fiber composite materials, composites including aramid fibers, and the like. All of the connectors 228 may be made from the same material. In an alternative embodiment, all of the connectors 228 may be made from different materials. In other words, the composition of the connectors 228 is not contemplated to be limited to any particular material or combination of materials.

As illustrated in FIG. 21, the connectors 228 are contemplated to be connected to the first skin element 222 and the second skin element 226 via fasteners 230. The connectors 228 are illustrated with a scissor-jack construction. However, this construction is intended to be merely illustrative and not limiting of the present invention. The connectors 228 are contemplated to provide sufficient tension for the third skin element 226, which is flexible, as discussed above. It is contemplated that the connectors 228 will be lockable to lock the configuration of the first, second, and third skin elements 222, 224, 226 after morphing.

In this fourth embodiment, it is contemplated that only one of either the first or second skin elements 222, 224 is attached to a rib. In other words, it is contemplated that only one of the first or second skin elements 222, 224 is fixed. The other floats and the connectors 228 provide tension to the third skin element 226.

With respect to the morphing aircraft skin 220, the third skin element 226 may be the flexible skin 180, the sliding skin 186, or the parallel hybrid skin 210. In other words, the third skin element 226 may be any of the previous embodiments of the morphing aircraft skin 180, 186, 210 discussed above. Other variations and substitutions also are contemplated to fall within the scope of the present invention.

With respect to the four embodiments of the present invention, the morphing aircraft skin 180, 186, 210, 220 is contemplated to be connected to at least one rigid member or fixed structure, such as one of the ribs 182, 184, 188, 190, 212, 214. The rigid member is contemplated to be an element of the aircraft 10 that is structural in nature. As noted above, in the context of the wings 24, 26 of an aircraft, the rigid members are the ribs 182, 184, 188, 190, 212, 214 that establish, among other parameters, the shape of the wings 24, 26.

As should be apparent from the foregoing, a rigid member is not intended to refer to a structure is immovable. With respect to the wings 24, 26, the rigid members are contemplated to move in relation to one another.

It is also noted that, without limitation of the present invention, the morphing aircraft skin may be active or passive in different contemplated embodiments of the present invention. A morphing aircraft skin made from a metallic alloy, for example, with no large displacement dependency on temperature activation or electrical activation qualifies as an active skin. A morphing aircraft skin made from a SMA, capable of changing its shape via temperature activation or electrical activation qualifies as a passive skin.

As noted above, the present invention is described in connection with one or more embodiments thereof. The embodiments are intended to be illustrative of the breadth of the present invention. Focus on any one particular embodiment is not intended to be limiting thereof. The present invention, therefore, is intended to encompass variations and equivalents, as would be appreciated by those skilled in the art.

What is claimed is:

1. An aircraft skin assembly, the skin assembly comprising: a first rigid member, wherein the first rigid member comprises at least a portion of an aircraft structural frame; a second rigid member, wherein the second rigid member also comprises at least a portion of the aircraft structural frame, wherein the second rigid member is moveable with respect to the first rigid member, and wherein a distance is defined between the first rigid member and the second rigid member; a morphing member extending between the first rigid member and the second rigid member, wherein the morphing member compensates for at least one of a change in the distance and a change in an orientation between the first rigid member and the second rigid member; wherein the morphing member comprises: a plurality of first segments attached to the first rigid member; and a plurality of second segments attached to the second rigid member; wherein the first segments are moveable with respect to one another, wherein the second segments are moveable with respect to one another, wherein the first segments form a first portion and the second segments form a second portion and said portions are separated from one another along a substantially linear seam in the absence of change in the distance and the orientation between the first rigid member and the second rigid member.

2. The aircraft skin assembly of claim 1, wherein: the first segments are in register with corresponding ones of the second segments, the first segments are slidingly disposed adjacent to the second segments, and the first segments overlap the second segments.

3. The aircraft skin assembly of claim 1, wherein the first segments and the second segments comprise at least one of aluminum, an alloy of aluminum, beryllium, an alloy of beryllium, magnesium, an alloy of magnesium, iron, an alloy of iron, polymers, ceramics, and composite materials.

* * * * *